(12) United States Patent
Honkanen et al.

(10) Patent No.: US 10,218,951 B2
(45) Date of Patent: Feb. 26, 2019

(54) MEMS SCAN CONTROLLED KEYSTONE AND DISTORTION CORRECTION

(71) Applicant: Microvision, Inc., Redmond, WA (US)

(72) Inventors: Jari Honkanen, Monroe, WA (US); Robert James Jackson, Monroe, WA (US); P. Selvan Viswanathan, Bellevue, WA (US); Jonathan A. Morarity, Seattle, WA (US); David W. Armour, Kirkland, WA (US)

(73) Assignee: Microvision, Inc., Redmond, WA (US)

( * ) Notice: Subject to any disclaimer, the term of this patent is extended or adjusted under 35 U.S.C. 154(b) by 1 day.

(21) Appl. No.: 15/983,508

(22) Filed: May 18, 2018

(65) Prior Publication Data

US 2018/0270459 A1  Sep. 20, 2018

Related U.S. Application Data

(63) Continuation of application No. 14/987,010, filed on Jan. 4, 2016, now Pat. No. 10,009,585.

(51) Int. Cl.
*G03B 21/14* (2006.01)
*H04N 9/31* (2006.01)

(52) U.S. Cl.
CPC ......... *H04N 9/3185* (2013.01); *G03B 21/147* (2013.01); *H04N 9/315* (2013.01); *H04N 9/3129* (2013.01); *H04N 9/3135* (2013.01); *H04N 9/3194* (2013.01)

(58) Field of Classification Search
CPC ...... H04N 9/3129; H04N 9/3185; H04N 9/22; H04N 9/3135; H04N 9/3194; G02B 26/123; G02B 26/101
See application file for complete search history.

(56) References Cited

U.S. PATENT DOCUMENTS

| 7,441,906 | B1 | 10/2008 | Wang |
| 8,111,336 | B2 * | 2/2012 | Freeman ............ H04N 9/3129 348/746 |
| 8,497,888 | B2 | 7/2013 | Tanaka |
| 9,251,730 | B2 | 2/2016 | Chikaoka |
| 2012/0182531 | A1 | 7/2012 | Uneo et al. |
| 2016/0366377 | A1 | 12/2016 | Lim |

* cited by examiner

*Primary Examiner* — William C. Dowling
(74) *Attorney, Agent, or Firm* — Kevin D. Wills

(57) ABSTRACT

Briefly, in accordance with one or more embodiments, a MEMS scanned beam projector includes a light source to emit a light beam, a scanning platform to redirect the light beam impinging on the platform, and a display controller to control the light source and the scanning platform to cause the scanning platform to scan the light beam in a vertical direction and a horizontal direction in a scan pattern to project an image onto a projection surface. The display controller is configured to correct for image distortion in the projected image by providing a compensated drive signal to the scanning platform to compensate for the image distortion.

23 Claims, 20 Drawing Sheets

MEMS SCAN CONTROLLED KEYSTONE AND DISTORTION CORRECTION

PRIORITY CLAIM

This application is a continuation of and claims priority to U.S. patent application Ser. No. 14/987,010, filed Jan. 4, 2016, which is hereby incorporated by reference in its entirety.

BACKGROUND

Projectors ordinarily are designed to produce a rectangular image when projecting onto a screen or other projection surface from an angle that is perpendicular to or aligned with the normal of the projection surface. Image distortion occurs when a projector is aligned at a different, oblique angle to the projection surface, or when the projection surface itself is angled, curved, or in some way irregular with respect to the projector. The keystone effect is one of the most common forms of distortion which results in an image that is trapezoidal rather than rectangular.

In order to address the keystoning problem, projectors typically utilize either optical or digital approaches to correct image distortion. Optical keystone correction involves a physical adjustment to the projector lens so that the projector projects at a different angle than it would be for a normal projection angle on a flat projection surface. Optical keystone correction generally is more effective if the projector is sufficiently far from the projection surface. Digital keystone correction involves applying correction within digital video processing by converting and prescaling the image before the image is projected. One disadvantage of prescaling the video image is that the number of individual pixels in the image is reduced, thereby lowering the display resolution and degrading the projected image quality.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1A:
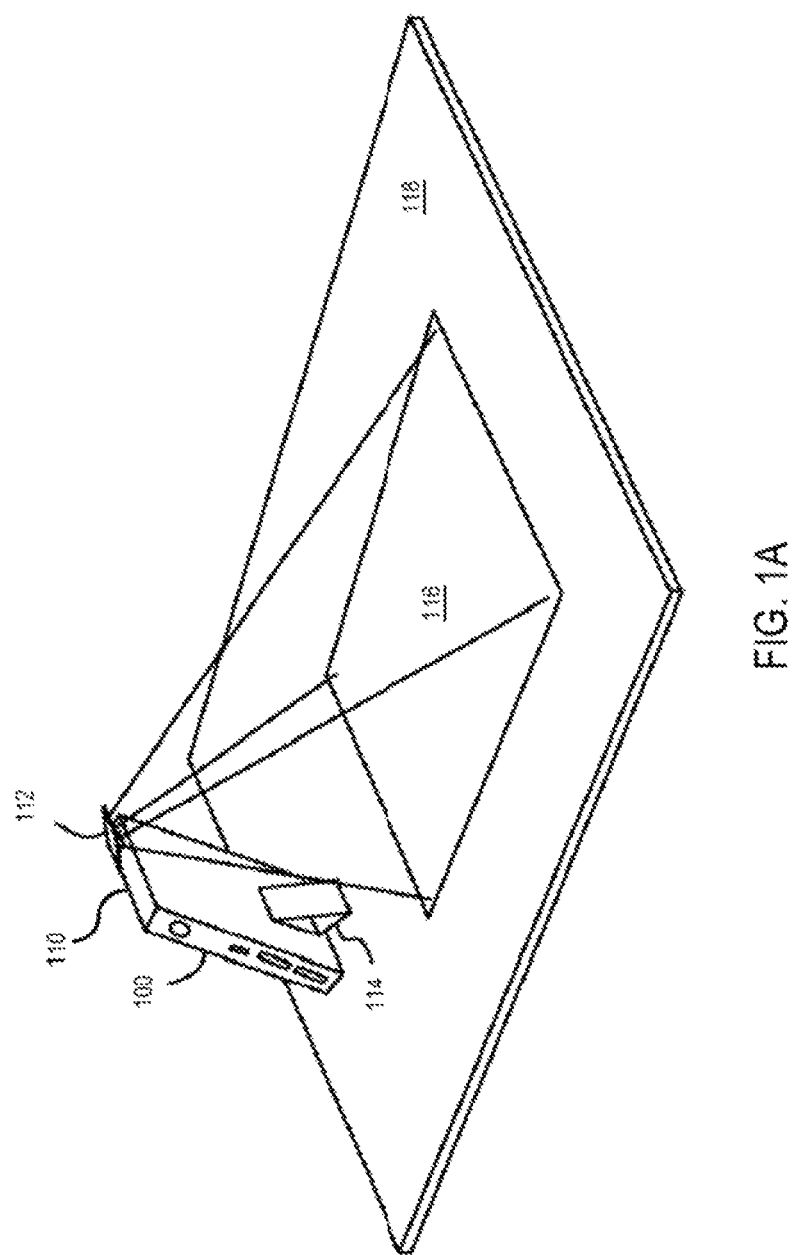
FIG. 1A is a diagram of an information handling system that includes a microelectromechanical systems (MEMS) scanned beam projector to project an image on a projection surface in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1A, a diagram of an information handling system that includes a microelectromechanical (MEMS) scanned beam projector to project an image on a projection surface in accordance with one or more embodiments will be discussed. As shown in FIG. 1A, an information handling system 100 may include a projector 110 such as a MEMS based scanned beam projector to project an image 116 onto a projection surface 118. In some embodiments, information handling system 100 may include a mechanism 112 to redirect the image 116 out of information handling system 100 and onto projection surface 118 when information handling system 100 is positioned in a vertical or nearly vertical position. Mechanism 112 may be a simple first surface flat mirror or a compound mirror with optic power or alternatively may be a compound free form optic with nil or one or more mirrored surfaces. Alternatively, projector 110 may project the image 116 directly from a surface of the information handling system 100 without using a mechanism 112 to redirect the projected image 116. In some embodiments, information handling system 100 may include a kickstand 114 to position the information handling system 100 and hold it steady when the information handling system 100 is placed on the projection surface 118 during viewing of the image 116, for example where the projection surface 118 is a table or desktop. In other embodiments, projection surface 118 might be a wall with the information handling system 100 set flat on a table or desktop with mechanism 112 redirecting the projected image onto a wall. In other embodiments, a user may hold the information handling system 100 in the user's hand during projection of the image 116 onto projection surface 118. It should be noted that information handling system 100 may comprise a handheld device such as a smartphone or tablet that includes a projector 110, or alternatively information handling system 100 may simply comprise a standalone projector device that includes a projector 110. Furthermore, projector 110 may comprise a MEMS based scanned beam projector such as shown in and described with respect to FIG. 3, below. If the projected image 116 is projected at an oblique angle with respect to the projection surface 118, the projected image may be distorted with a keystone effect. Such image distortion is shown in and described with respect to FIG. 2, below.

Figure 1B:
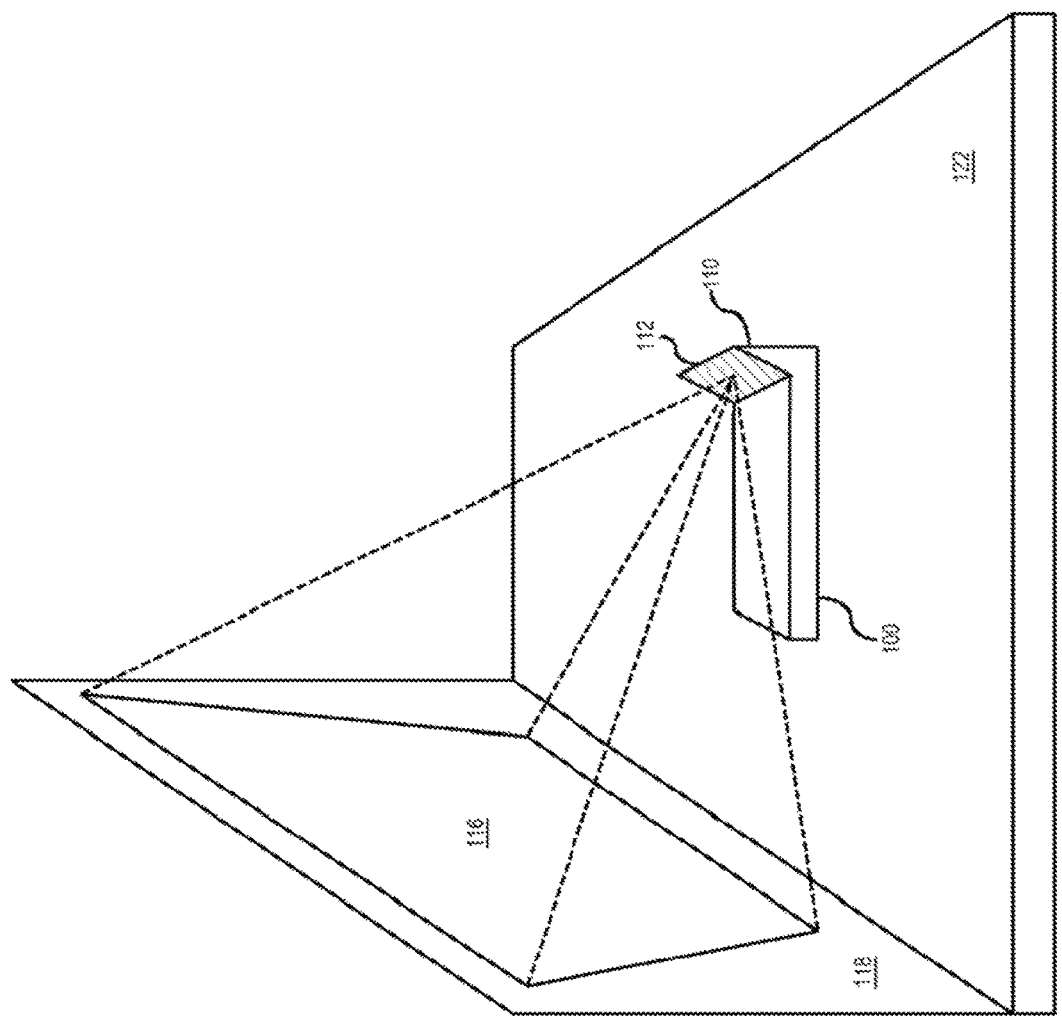
FIG. 1B is a diagram of the information handling system of FIG. 1A illustrating a table top use example in accordance with one or more embodiments.

FIG. 1B is a diagram of the information handling system illustrating a table top use example in accordance with one or more embodiments. The embodiment of information handling system 100 shown in FIG. 1B is substantially similar to the embodiment of information handling system 100 of FIG. 1A, except FIG. 1B illustrated an example of using information handling system 100 on a support surface 122 such as a table top, and the projected image 116 is projected onto a vertical projection surface 118 such as a wall or a projection screen. Other example uses of the information handling system 100 similarly may be deployed, for example where information handling system 100 is mounted on a ceiling and the projected image 116 is projected onto a vertical projection surface 118 such as a wall or a projection screen, and the scope of the claimed subject matter is not limited in this respect.

Figure 2:
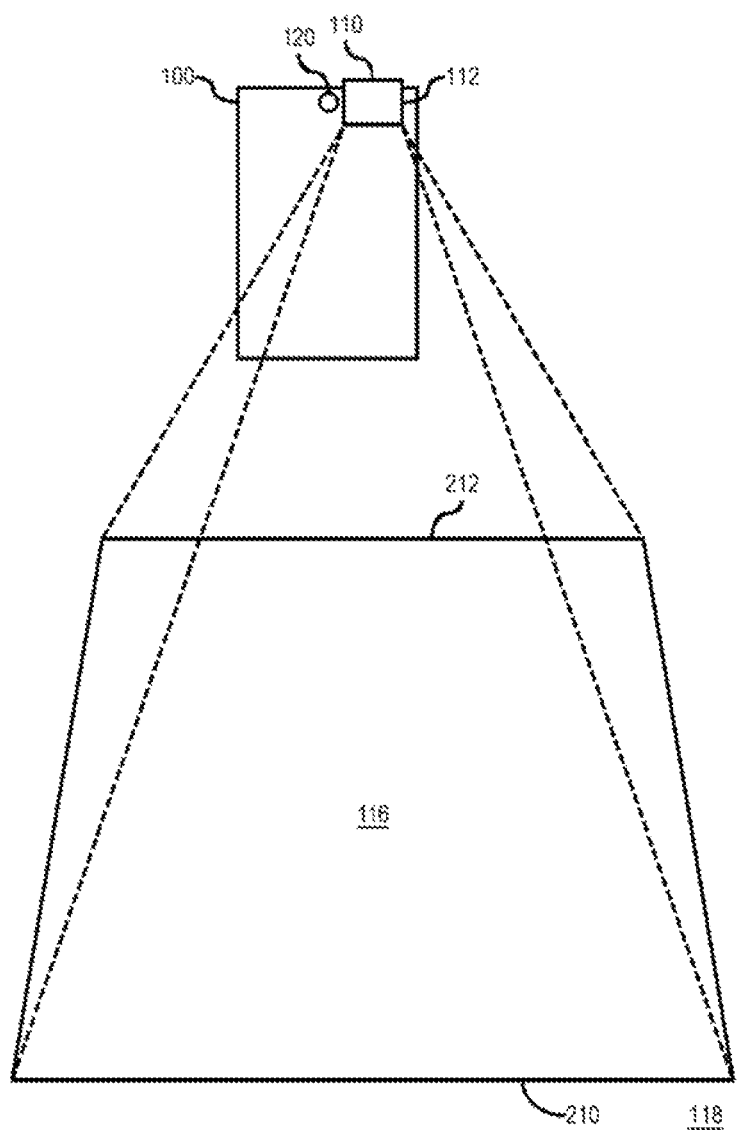
FIG. 2 is a diagram of the information handling system of FIG. 1A or 1B illustrating image distortion such as keystoning that may occur from an oblique projection axis with respect to the projection surface in accordance with one or more embodiments.

Referring now to FIG. 2, a diagram of the information handling system of FIG. 1A or FIG. 1B illustrating image distortion such as keystoning that may occur from an oblique projection axis with respect to the projection surface in accordance with one or more embodiments will be discussed. As shown in FIG. 2, the projected image 116 may suffer image distortion such as keystoning if the image 116 is projected at an angle that is different than normal with respect to the plane or surface of projection surface 118. Such distortion in the projected image 116 may include horizontal stretching at the distal end 210 of the image 116 with respect to the proximal end 212 of the image. The resulting image 116 as shown in FIG. 2 is a trapezoidally shaped image 116 rather than a rectangularly shaped image 116. For more extreme projection angles away from normal, and/or for smaller throw ratios of the projected image 116, where throw ratio is the ratio of the distance from the projector 110 to the projection surface 118 to the width of the projected image 116, the resulted image distortion becomes more extreme. The image distortion may also include a change in the aspect ratio of the projected image 116. For example, if the image 116 is a 16:9 image, the image distortion causes the aspect ratio of the projected image 116 to no longer be a 16:9 aspect ratio even if trapezoid distortion in the image is compensated for resulting in a rectangular keystone-corrected image. In addition, the image distortion may result in vertical stretching of the image at the distal end 210 of the image 210 with respect to the proximal end 212 of the image. With vertical stretching image distortion, the horizontal line spacing in the image changes based on vertical position along the image. In one or more embodiments, as discussed herein, the operation of a MEMS based scanned beam projector 110 may be adjusted to correct for one or more of these three image distortion artifacts without adversely affecting the resolution or quality of the projected image. Such a MEMS based scanned beam projector 110 is shown in and described with respect to FIG. 3, below. In some embodiments, the information handling system 100 may include a camera 120 to detect distortion of the projected image 116 to calibrate image distortion correction and/or to continually and dynamically alter the image distortion correction with varying distortion as discussed with respect to FIG. 13, below.

Figure 3:
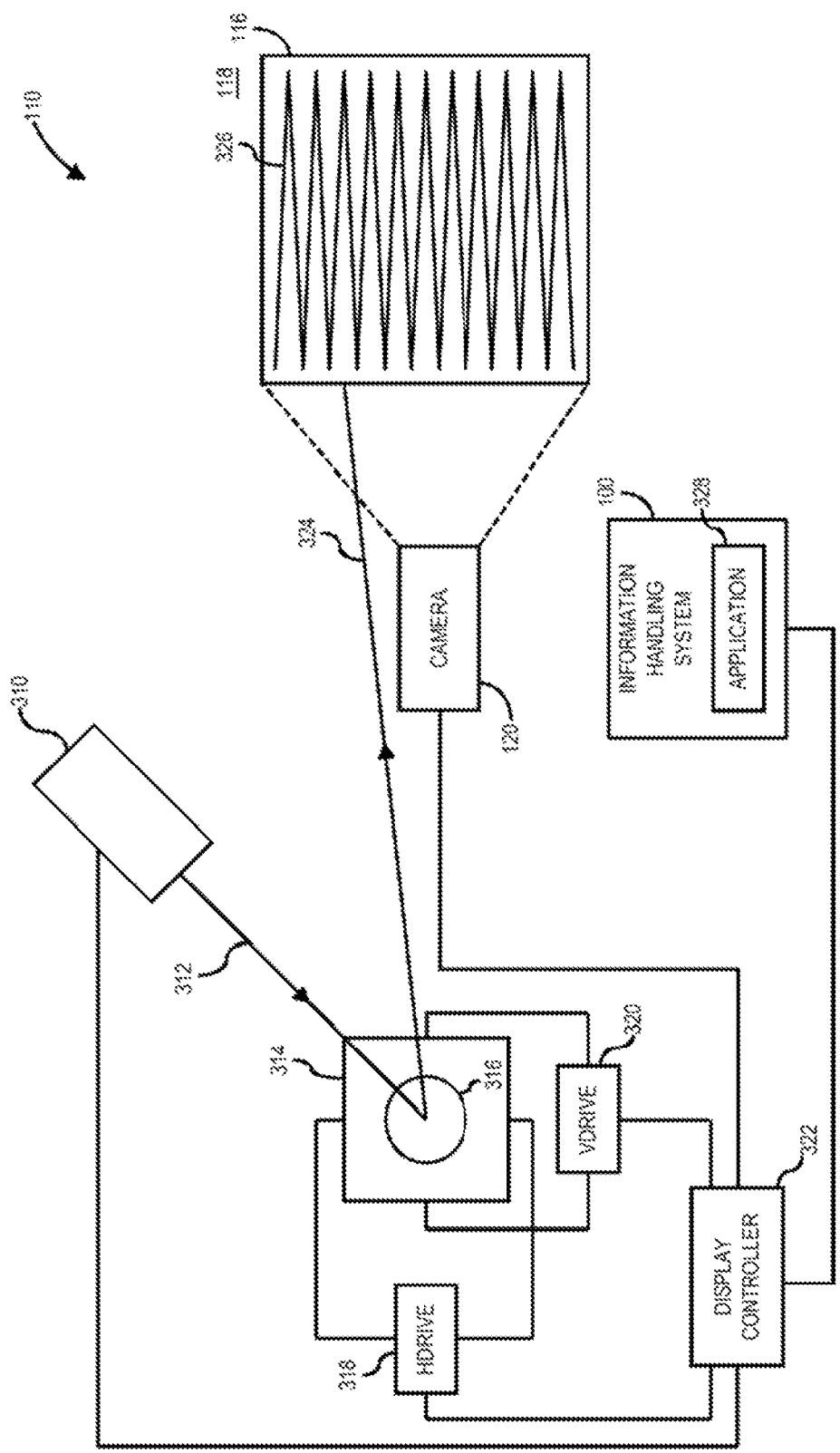
FIG. 3 is a diagram of a MEMS scanned beam projector in accordance with one or more embodiments to project an image on a projection surface, and to detect and correct image distortion such as keystoning in accordance with one or more embodiments.

Referring now to FIG. 3, a diagram of a MEMS scanned beam projector in accordance with one or more embodiments to project an image on a projection surface, and to detect and correct image distortion such as keystoning in accordance with one or more embodiments will be discussed. Although FIG. 3 shows a MEMS scanned beam projector 110 for purposes of example and discussion, it should be noted that the subject matter discussed herein may be utilized with displays other than a scanned beam display, and the scope of the claimed subject matter is not limited in this respect. As shown in FIG. 3, the projector 110 may comprise a light source 310, which may be a laser light source such as a laser or the like, capable of emitting a beam 312 which may comprise a laser beam. The beam 312 impinges on a scanning platform 314 which may comprise a microelectromechanical (MEMS) based scanning platform or the like, and reflects off of scanning mirror 316 to generate a controlled output beam 324. A horizontal drive circuit 318 and a vertical drive circuit 320 modulate the direction in which scanning mirror 316 is deflected to cause output beam 324 to generate a raster scan (or scan pattern) 326, thereby creating a displayed image 116 on a projection surface 118. It should be noted that although a raster scan is shown and discussed herein as one example scan pattern for purposes of discussion and example, other scanning patterns likewise may be utilized other than a raster scan, for example a Lissajous pattern, and the scope of the claimed subject matter is not limited in this respect. A display controller 322 controls horizontal drive circuit 318 and vertical drive circuit 320 by converting pixel information of the displayed image into laser modulation synchronous to the scanning platform 314 to write the image information as displayed image 116 based upon the position of the output beam 324 in raster scan (or scan pattern) 326 and the corresponding intensity and/or color information at the corresponding pixel in the image 116. Display controller 322 may also control other various functions of projector 110. It should be noted that the MEMS scanning platform is not limited to a single scanning mirror system. In some embodiments, the scanning platform may comprise multiple mirrors to effect fully or at least in in part the deflection expected in a certain axis. In such a case, the drive circuitry would be distributed between the multiple mirrors for the plane or axis of deflection. Furthermore, the mirrors in the MEMS scanning platform may be actuated either electromagnetically, electrostatically, or in a hybrid or other manner for each of the axes of deflection. The MEMS scanning platform described herein is not a limitation of the claimed subject matter.

In one or more particular embodiments, the projector 110 as shown in FIG. 3 may comprise a pico-display developed by Microvision, Inc., of Redmond, Wash., USA, referred to as PicoP®. In such embodiments, the light source 310 of such a pico-display may comprise one red, one green, and one blue laser, with a lens near the output of the respective lasers that collects the light from the laser and provides a very low numerical aperture (NA) beam at the output. It should be noted that although the light source 310 discussed herein for purposes of example includes a red, a green, and a blue light source (RGB), light source 310 alternatively may include various other colors, both in the visible and/or in the invisible light spectrum, for example any color of lasers having wavelengths ranging from infrared to near ultraviolet or ultraviolet, and the scope of the claimed subject matter is not limited in this respect. The light from the lasers may then be combined with dichroic elements into a single white beam 312. Using a beam splitter and/or basic fold-mirror optics, the combined beam 312 may be relayed onto a mirror 316 of a biaxial MEMS scanning platform 314 that scans the output beam 324 in a raster scan (or scan pattern) 326. Modulating the lasers synchronously with the position of the scanned output beam 324 may create the projected image 116. In one or more embodiments the projector 110, or engine, may be disposed in a single module known as an Integrated Photonics Module (IPM), which in some embodiments may be 7 millimeters (mm) in height and less than 5 cubic centimeters (cc) in total volume, although the scope of the claimed subject matter is not limited in these respects.

In one or more embodiments, the projector 110 may include a camera 120 or other image detecting device to capture at least a portion of the projected image 116 to facilitate the determination whether any keystone image distortion exists. The image data captured by camera 120 may be provided to display controller 322 to provide for image distortion correction by altering the operation of scanning platform 314 as discussed in further detail herein. In some embodiments, light source 310 may include an invisible light source such as an infrared light source that may project an infrared beam or component of beam 324 as part of image 116. Such a beam may be invisible so as to not be noticeable by the user during viewing of image 116. The invisible light portion of image 116 may be detected by camera 120 as part of a image distortion calibration or correction process as discussed further herein with respect to FIG. 13, below. A camera 120 or other sensor may operate as a feedback mechanism to inform the display controller 322 or other processor about the extent of geometric distortion seen in the projected image 116. In one or more embodiments, information handling system 100 without a camera 120 or without other image also may correct for distortion in the projected image 116, for example if the feedback of oblique projection is acquired from inertial sensors in the information handling system 100. In such an example, information handling system 100 may assume that projection surface 118 is always planar such as a table, wall, projection screen, or a similar planar surface. In one embodiment, information handling system 100 may include a kick-stand with multiple stops or catches to change the tilt angle of information handling system. In such an embodiment, the a readout from inertial sensors readout may facilitate distortion compensation applied by the methods and techniques described herein, for example where the angular position of the information handling system 100 yields the angle of projection of the projected image 116 along with the height of the exit aperture from the support surface to be used to determine the amount of expected or previously measured image distortion.

In one or more embodiments, projector 110 may couple to or otherwise may be integrated within the information handling system 100. An application 328 may be executed on information handling system 326 for example to provide image or video information to projector 110, and/or optionally to assist with the image distortion correction performed by projector 110, although the scope of the claimed subject matter is not limited in these respects. A first example of controlling scanning platform 314 to correct image distortion is shown in and described with respect to FIG. 4, below.

Figure 4:
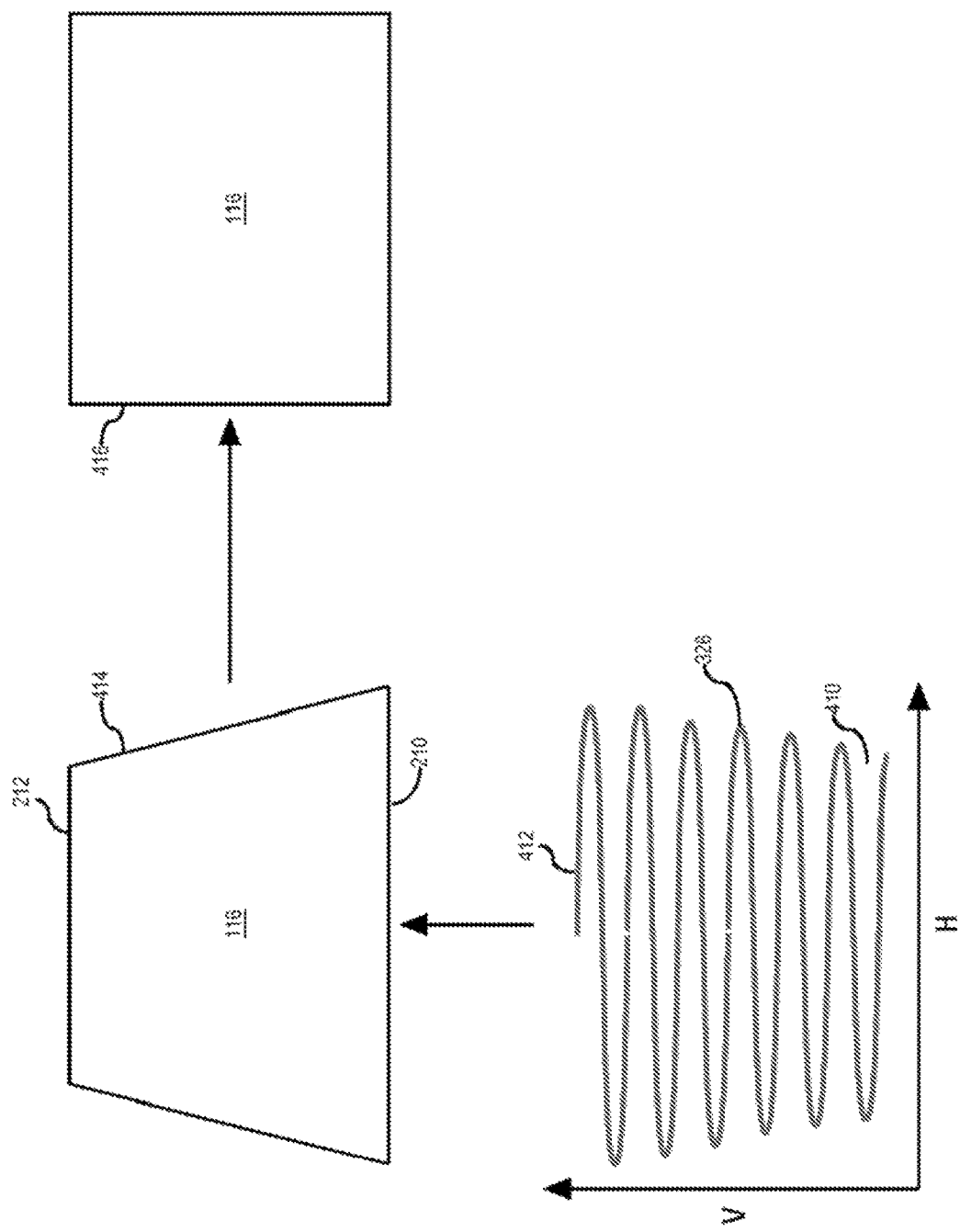
FIG. 4 is a diagram of keystone correction of an image via modulation of the fast scan amplitude as a function of vertical scan position in the image in accordance with one or more embodiments.

Referring now to FIG. 4, a diagram of keystone correction of an image via modulation of the fast scan amplitude as a function of vertical scan position in the image in accordance with one or more embodiments will be discussed. As shown in FIG. 4, a keystoned version 414 of the image 116 may be corrected by altering the raster scan (or scan pattern) 326 wherein the horizontal amplitude of the raster scan (or scan pattern) 326 may be altered as a function of the vertical scan position of the beam 324. Since the distal end 210 of the keystoned version 414 of the image 116 may be stretched horizontally with respect to the proximal end 212, the amplitude of the horizontal scan of scanning platform 314 may be reduced at vertical positions 410 corresponding to the distal end 210 of the image. The horizontal amplitude of the raster scan (or scan pattern) 326 may be varied in a manner to remove the trapezoidal shape of the keystoned version 414 of the image 116. In some embodiments, the horizontal amplitude of the raster scan (or scan pattern) 326 may be increased at vertical positions 412 corresponding to the proximal end 212 of the image if there is sufficient headroom in the deflection of the scanning platform 314 to allow for increased amplitudes. In any event, the display controller 322 may change the output of the horizontal drive circuit 318 to vary the horizontal amount of deflection of the scanning platform 314. As a result, the horizontal stretching component of the keystone distortion may be compensated by modulating the fast scan sinusoidal amplitude of the MEMS scanning platform 314 linearly as a function of vertical position. With a typical vertical refresh rate of 60 Hertz (Hz), the modulation profile may be periodic at the vertical refresh rate of 60 Hz with the fast (horizontal) scan angle being reduced as the trapezoidal distortion widens. The result is a horizontally compensated version 416 of image 116 with the trapezoidal distortion reduced or eliminated from the image 116. An alternative approach to remove the trapezoidal distortion is shown in and described with respect to FIG. 5, below.

Figure 5:
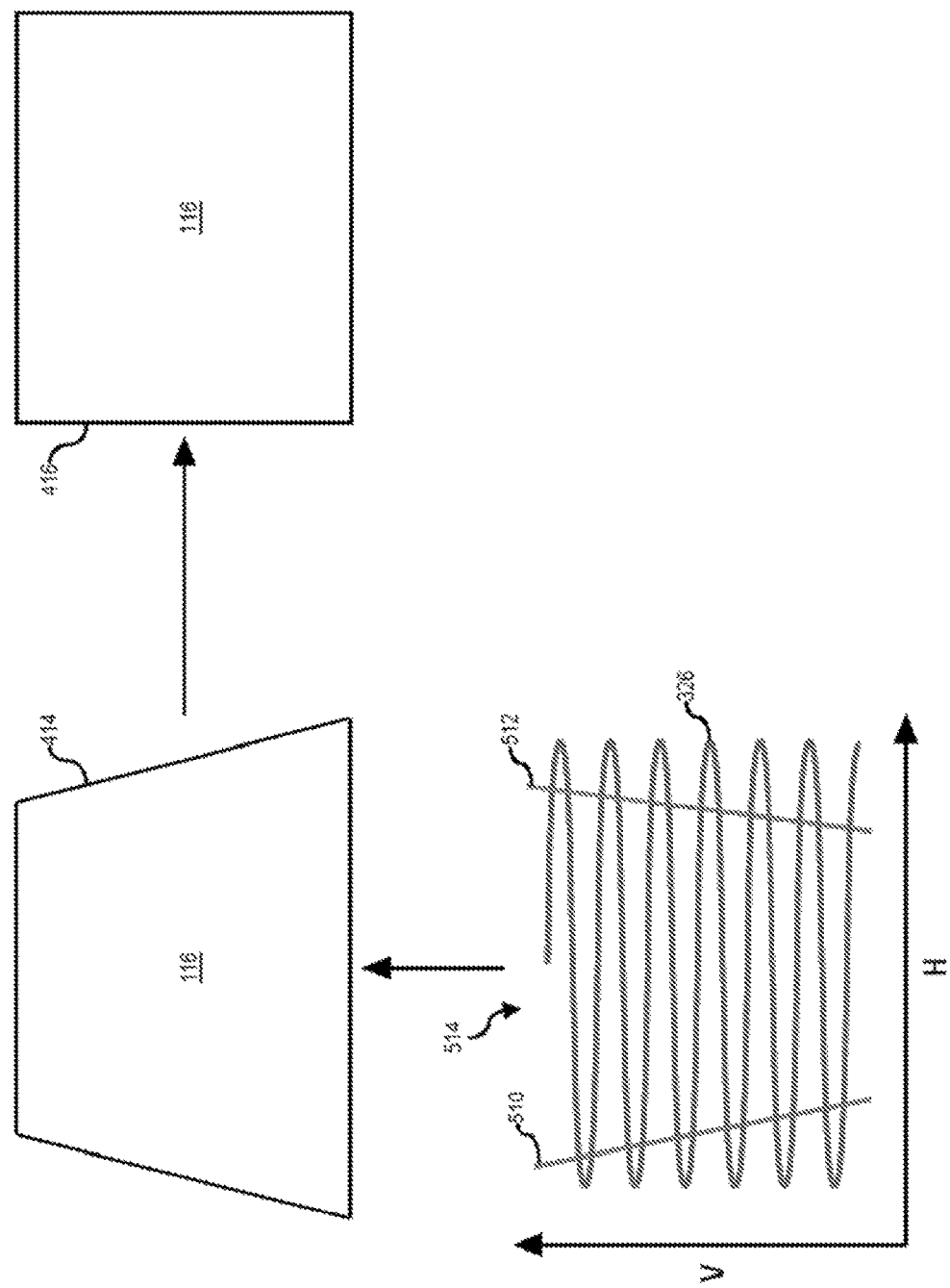
FIG. 5 is a diagram of keystone correction of an image via changing the interpolator active region as a function of vertical scan position in accordance with one or more embodiments.

Referring now to FIG. 5, a diagram of keystone correction of an image via changing the interpolator active region as a function of vertical scan position in accordance with one or more embodiments will be discussed. As an alternative to varying the amplitude of the fast (horizontal) scan amplitude of the scanning platform 314, FIG. 5 shows how video path interpolation may be utilized to remove trapezoidal distortion from a keystoned version 414 of the image. Projector 110 may comprise a laser beam scanning (LBS) display system that modulates the lasers to paint pixels on the trajectory of MEMS scanning platform 314. In a typical 720p system, the nominal horizontal resonant frequency of the scanning platform 314 is approximately 27 kHz, and full horizontal scan line is traversed in about 18.5 microseconds (µs). If the sample (pulse) rate of the lasers is 150 MHz, then projector 110 places approximately 2,200 laser pulses on a single horizontal scan line in a single direction in the active video region that does not include the horizontal blanking periods. Display controller 322 may include a video path interpolator operating in the scan domain to keep track of the instantaneous scan position and to interpolate between neighboring input (source) pixels to determine the appropriate output pixel intensity for the currently displayed pixel. The output may be oversampled as an input of 1,280 horizontal pixels from the image source are converted into 2,200 output laser pulses. In order to compensate for the trapezoidal image distortion due to the keystone effect, the interpolator can be commanded by display controller 322 to change its starting and ending positions along the horizontal lines of the raster scan (or scan pattern) 326 as a function of vertical position, and to adjust the interpolation rate accordingly as shown in FIG. 5. The start and end positions of the interpolator along the raster scan (or scan pattern) 326 are represented by line 510 and line 512. The active region 514 of the interpolator exists between line 510 and line 512 such that interpolation operates at different horizontal positions of raster scan (or scan pattern) 326 as a function of vertical position. Thus, the start and stop positions of the interpolator may be a function of the vertical position along the raster scan (or scan pattern) 326 in such a manner as to reduce or eliminate the trapezoidal distortion in the keystoned version 414 of the image to result in a trapezoid compensated version 416 of the image. Compensation of the trapezoidal component of the keystone distortion of image 116 may result in rectangular version of the image 116 with horizontal stretching removed. Compensation of the aspect ratio of the image may be performed as shown in an described with respect to FIG. 6, below.

Figure 6:
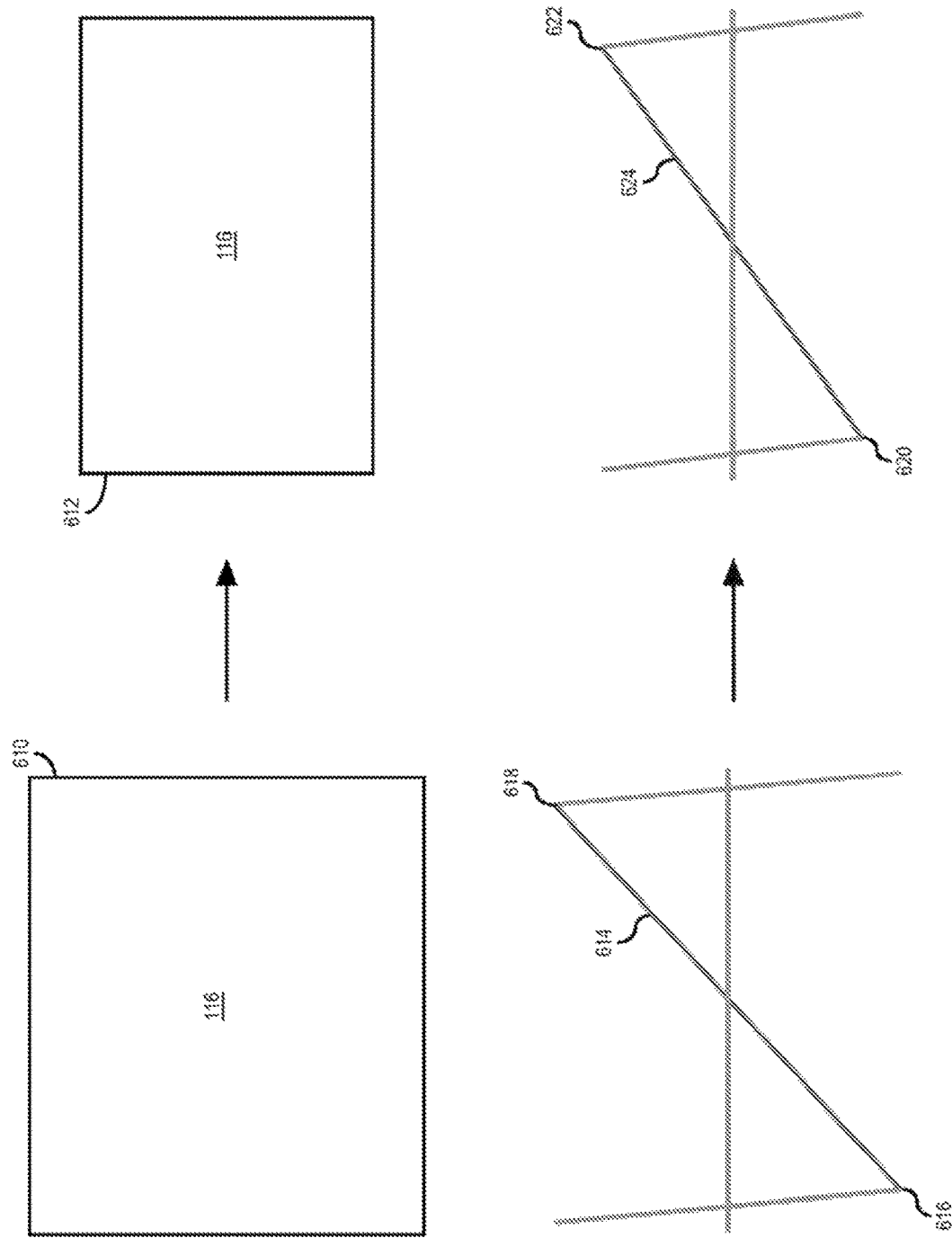
FIG. 6 is a diagram of aspect correction of an image that has been keystone corrected via reduction of the MEMS vertical scan angle.

Referring now to FIG. 6, a diagram of aspect correction of an image that has been keystone corrected via reduction of the MEMS vertical scan angle will be discussed. Once the trapezoidal distortion resulting from the horizontal stretching component of the keystone effect is compensated for in image 116, the resulting version 610 of the image 116 may have a different aspect ratio than the original source image, for example resulting in a version 610 of the image that is too tall in the vertical direction. In order to provide an aspect ratio of the projected image 116 that matched the aspect ratio of the original source image, the vertical height of the image 116 may be reduced by reducing the amplitude of the vertical ramp of the MEMS scanning platform 314. An uncompensated ramp 614 is shown on the left hand side of FIG. 6 having a standard ramp height wherein the display controller 322 causes the vertical drive circuit 320 to provide a drive voltage shown in ramp 614 to displace the scanning platform 314 to a maximum downward deflection with a maximum negative drive voltage 616 to linearly ramp up to a maximum upward deflection with a maximum positive drive voltage 618. The maximum downward deflection and the maximum upward deflection of scanning platform may be reduced by reducing the magnitudes of the maximum negative drive voltage and the maximum positive drive voltage to values as shown at voltage 620 and voltage 622 to provide a compensated ramp 624. As a result, amplitude of displacement of the scanning platform 314 is reduced to result in an aspect ratio compensation version 612 of image 116. For example, of the aspect ratio of the original source image is 16:9, then the aspect ratio of the aspect ratio compensated version 612 of image 116 is also 16:9 or nearly 16:9, although the scope of the claimed subject matter is not limited in this respect.

Figure 7:
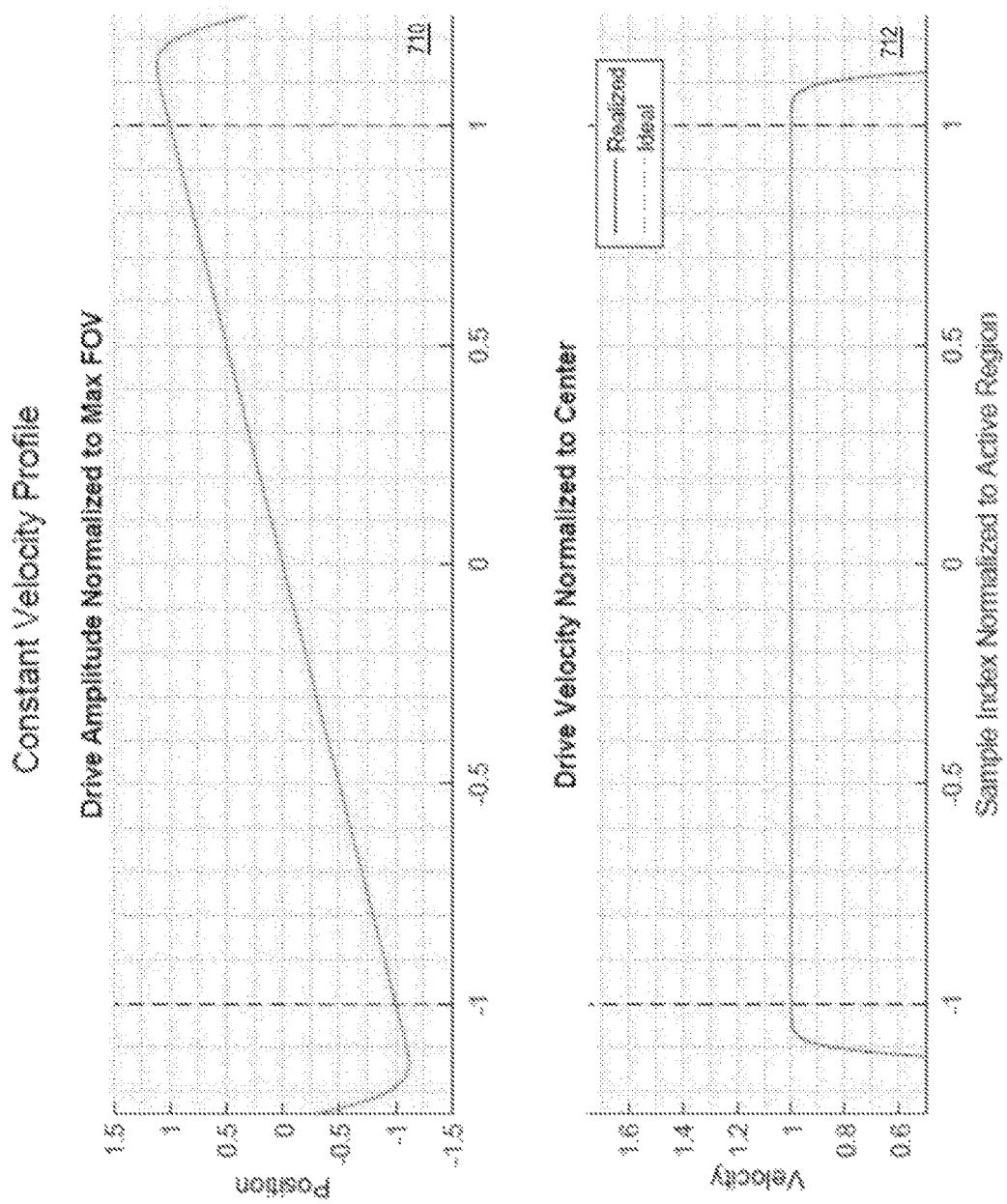
FIG. 7 are diagrams of a MEMS vertical ramp drive voltage for regular projection and a corresponding MEMS constant velocity profile in accordance with one or more embodiments.

Referring now to FIG. 7, diagrams of a MEMS vertical ramp drive voltage for regular projection and a corresponding MEMS constant velocity profile in accordance with one or more embodiments will be discussed. After applying compensation as shown in FIG. 4 or FIG. 5, and as shown in FIG. 6, the resulting image 116 is rectangular with a correct aspect ratio. The image, however, still may have image distortion as the vertical line spacing may vary with vertical position. The scanning platform 314 typically is driven in a vertical direction with a sawtooth ramp voltage with constant velocity over the active video region, for example as shown in FIG. 7. The upper diagram 710 shows the MEMS scanning platform 314 vertical ramp drive voltage for non-compensation projection, with the amplitude normalized to maximum field of view (FOV) of projector 110. The lower diagram 712 shows a constant velocity profile for movement of the MEMS scanning platform 314 over the active video area indicated by the dotted vertical lines normalized to the center of the displacement of the MEMS scanning platform 314. Compensation of the vertical spacing of the horizontal scan lines may be achieved by altering the velocity of the vertical displacement of the MEMS scanning platform 314 as shown in and described with respect to FIG. 8, below.

Figure 8:
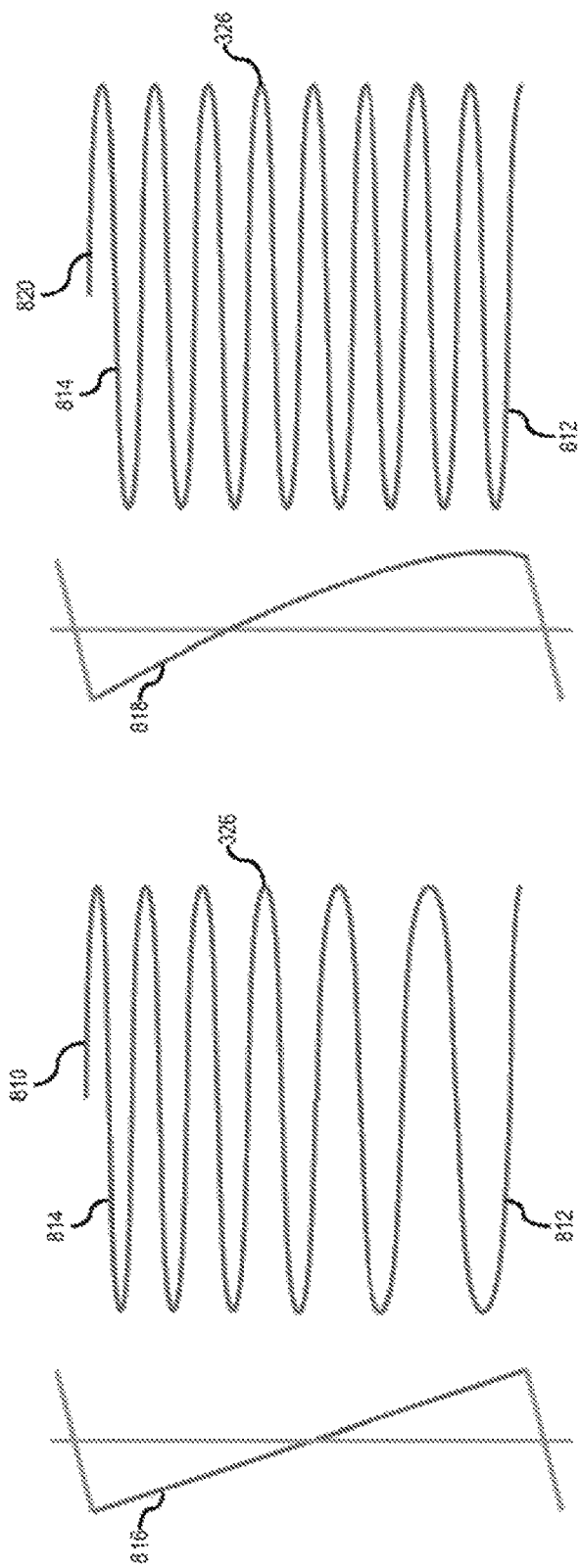
FIG. 8 is a diagram of correction of horizontal line spacing via modification of a vertical ramp that does not have a constant vertical velocity in accordance with one or more embodiments.

Referring now to FIG. 8, a diagram of correction of horizontal line spacing via modification of a vertical ramp that does not have a constant vertical velocity in accordance with one or more embodiments will be discussed. As shown in FIG. 8, an uncompensated version 810 of the raster scan (or scan pattern) 326 on the left hand side of FIG. 8 may have vertical spacing of the horizontal scan lines at regions 812 corresponding to the distal end 210 of the image 116 that is greater than the vertical spacing of the horizontal lines at regions 814 corresponding to the proximal end 212 of the image 116. A vertical ramp voltage for scanning platform 314 having a linear velocity is shown at plot 816. By changing the rate of change of the vertical ramp voltage for the scanning platform 314 over the vertical sweep of the scanning platform 314 as shown at plot 818, for example to provide a slower velocity at regions 812, the velocity of the vertical displacement of the scanning platform 314 may be altered such that the vertical spacing of the horizontal scan lines is constant, or nearly constant, over the entirety of the raster scan (or scan pattern) 326 to provide a vertically compensated version 820 of the raster scan (or scan pattern) 326 as shown in the right hand side of FIG. 8.

Figure 9:
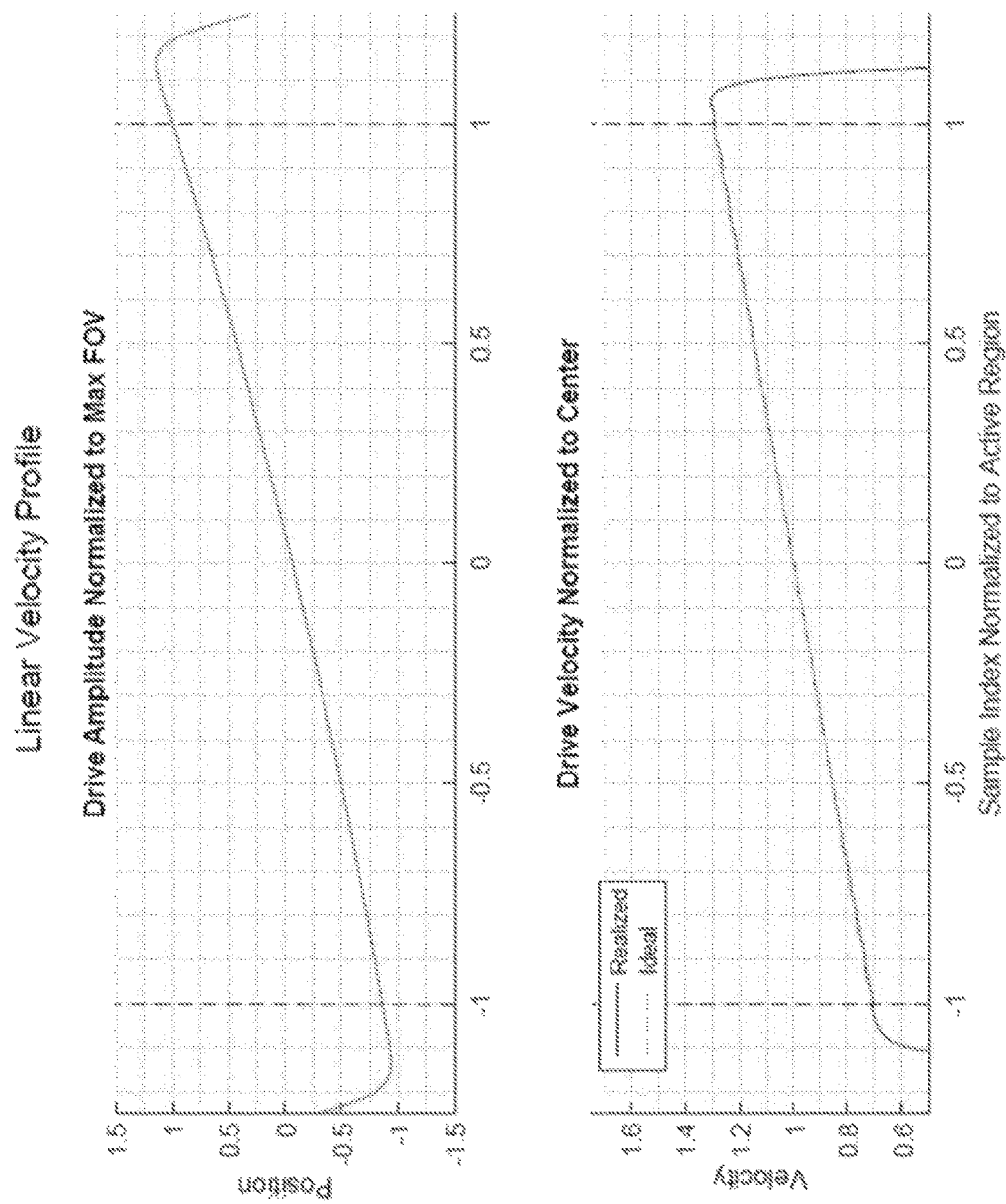
FIG. 9 is a diagram of a MEMS vertical ramp velocity profile and drive amplitude with linearly increasing velocity in accordance with one or more embodiments.
Figure 10:
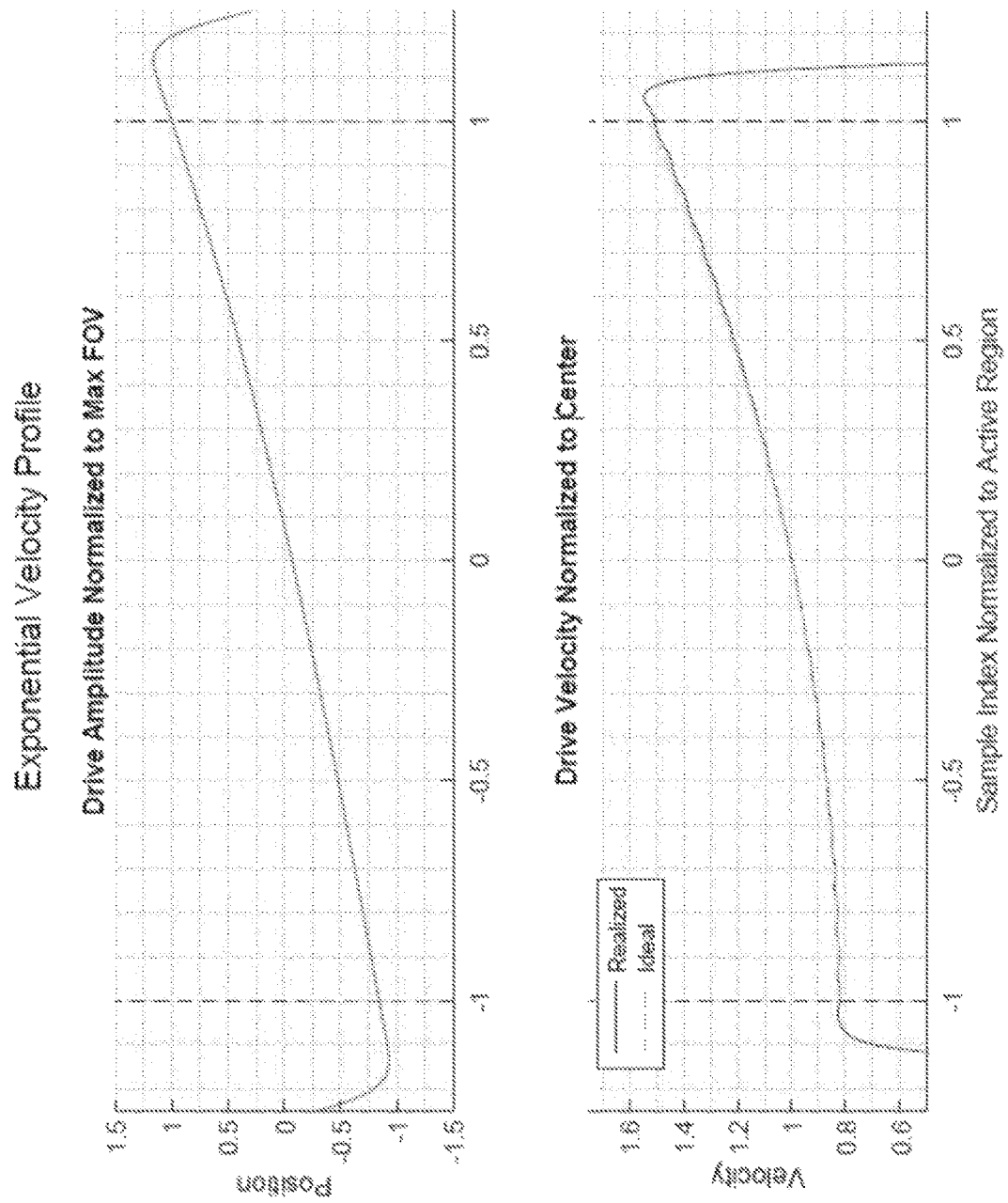
FIG. 10 is a diagram of a MEMS vertical ramp velocity profile and drive amplitude with exponentially increasing velocity in accordance with one or more embodiments.
Figure 11:
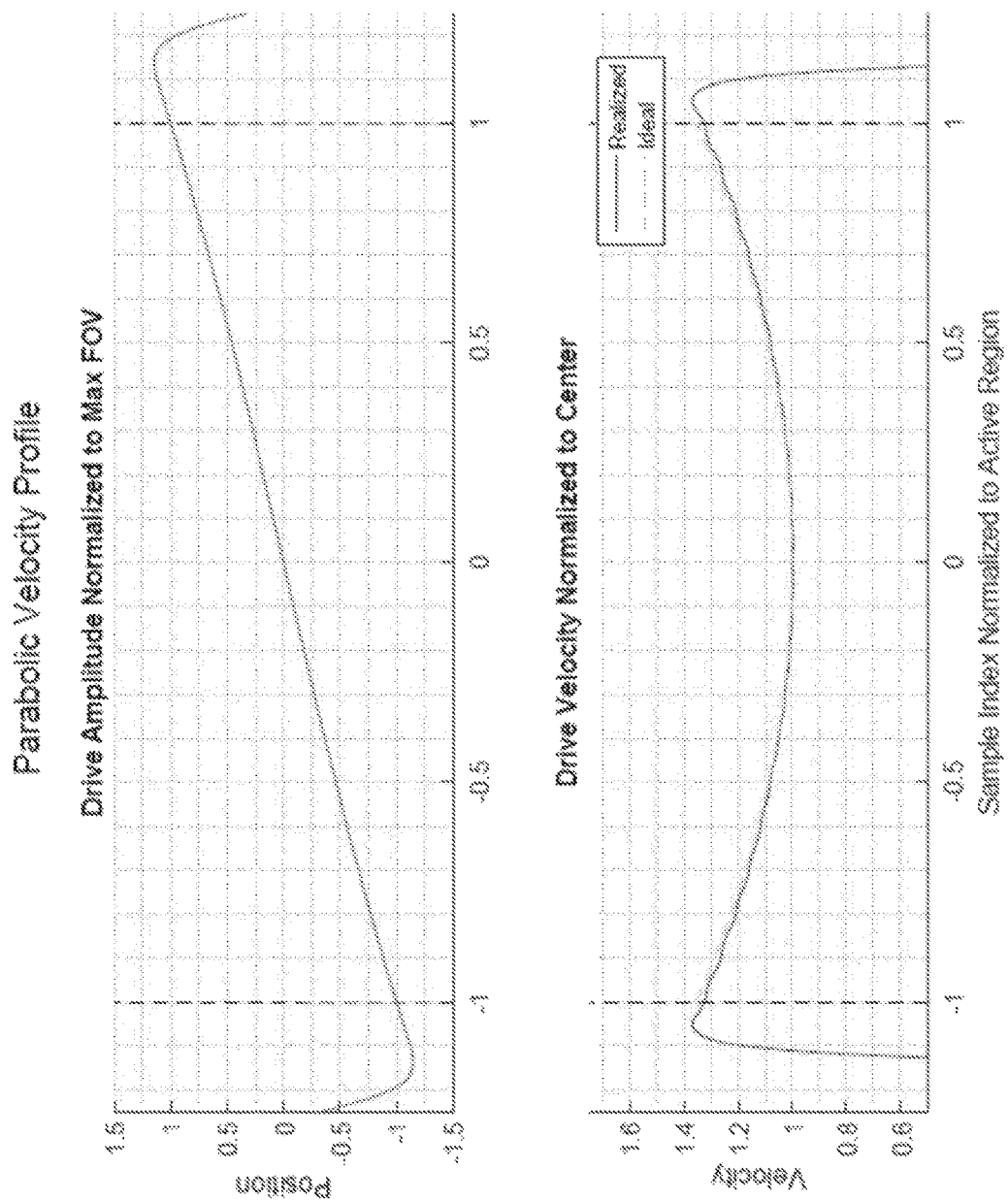
FIG. 11 is a diagram of a MEMS vertical ramp velocity profile and drive amplitude with a parabolically changing velocity in accordance with one or more embodiments.
Figure 12:
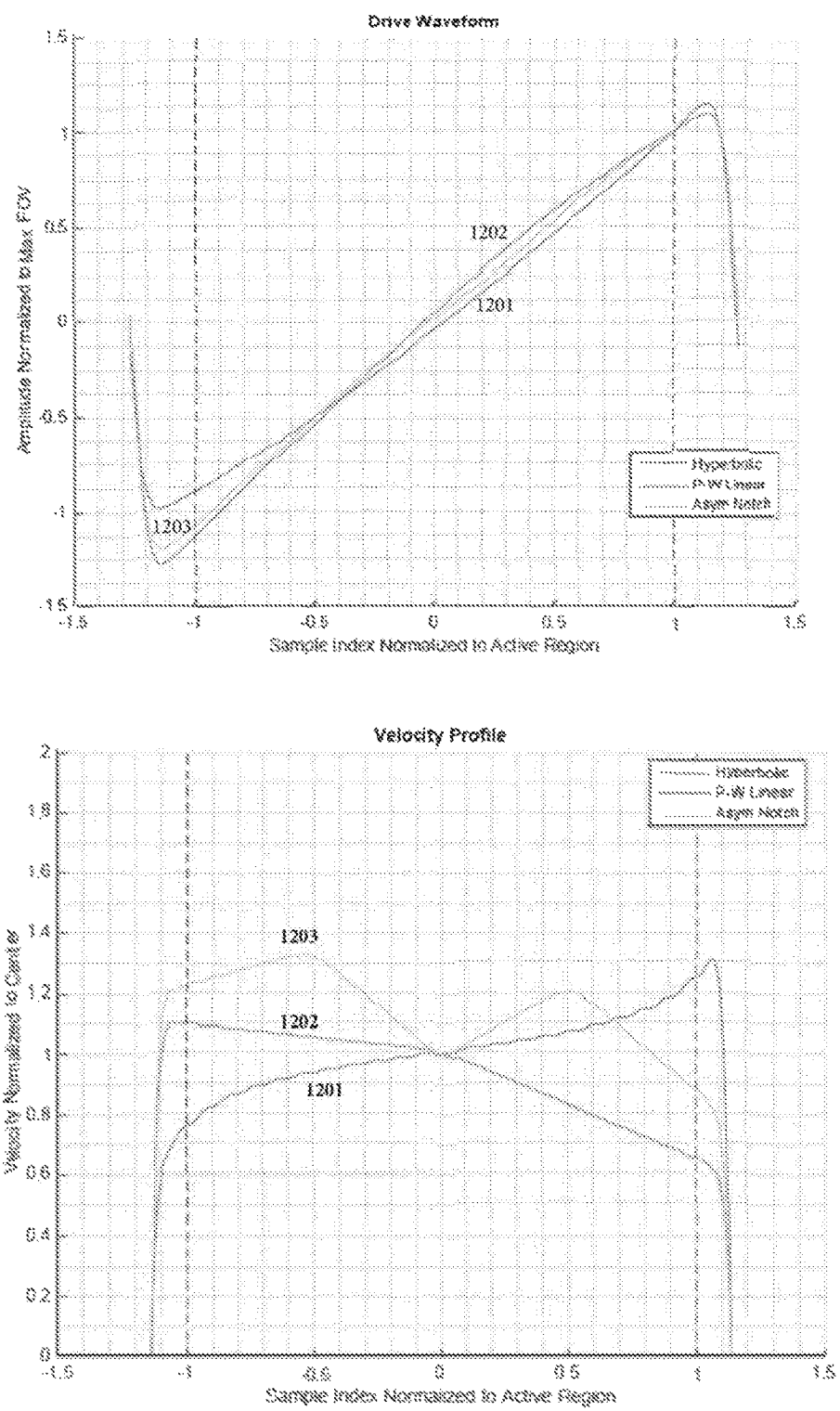
FIG. 12 is a diagram of a MEMS vertical ramp velocity profile and drive amplitude with a hyperbolic, piece-wise linear, and asymmetrical notch velocity in accordance with one or more embodiments.

Referring now to FIG. 9 through FIG. 12, diagrams of a various MEMS ramp velocity profiles and drive amplitudes in accordance with one or more embodiments will be discussed. In one or more embodiments, display controller 322 is capable of driving MEMS scanning platform 314 in a vertical direction with various velocity profiles. Display controller 322 may drive MEMS scanning platform 314 to compensate for image distortion resulting from various shapes of the projection surface 118 other than a flat, planar surface as shown in FIG. 1A or FIG. 1B. For example, image distortion caused by uneven, curved, spherical, or other irregular surfaces can be compensated in a manner substantially similar to compensating for keystone image distortion by driving MEMS scanning platform 314 in such a manner as to correct for the resulting image distortion. FIG. 9 shows an example ramp profile having a linearly increasing velocity. FIG. 10 shows an example MEMS vertical ramp velocity profile and drive amplitude with exponentially increasing velocity for compensating projecting image 116 onto a curved projection surface 118. FIG. 11 shows an example MEMS vertical ramp velocity profile and drive amplitude with a parabolically changing velocity for compensating projecting image 116 onto a spherical projection surface 118. FIG. 12 shows an example MEMS vertical ramp velocity profile and drive amplitude with a hyperbolic 1201, piece-wise linear 1202, asymmetrical notch 1203 velocity for compensating projecting image 116 onto various other irregular or non-planar projection surfaces. It should be noted that these are merely a few example vertical drive amplitudes and velocity profiles, and the scope of the claimed subject matter is not limited in these respects.

Figure 13:
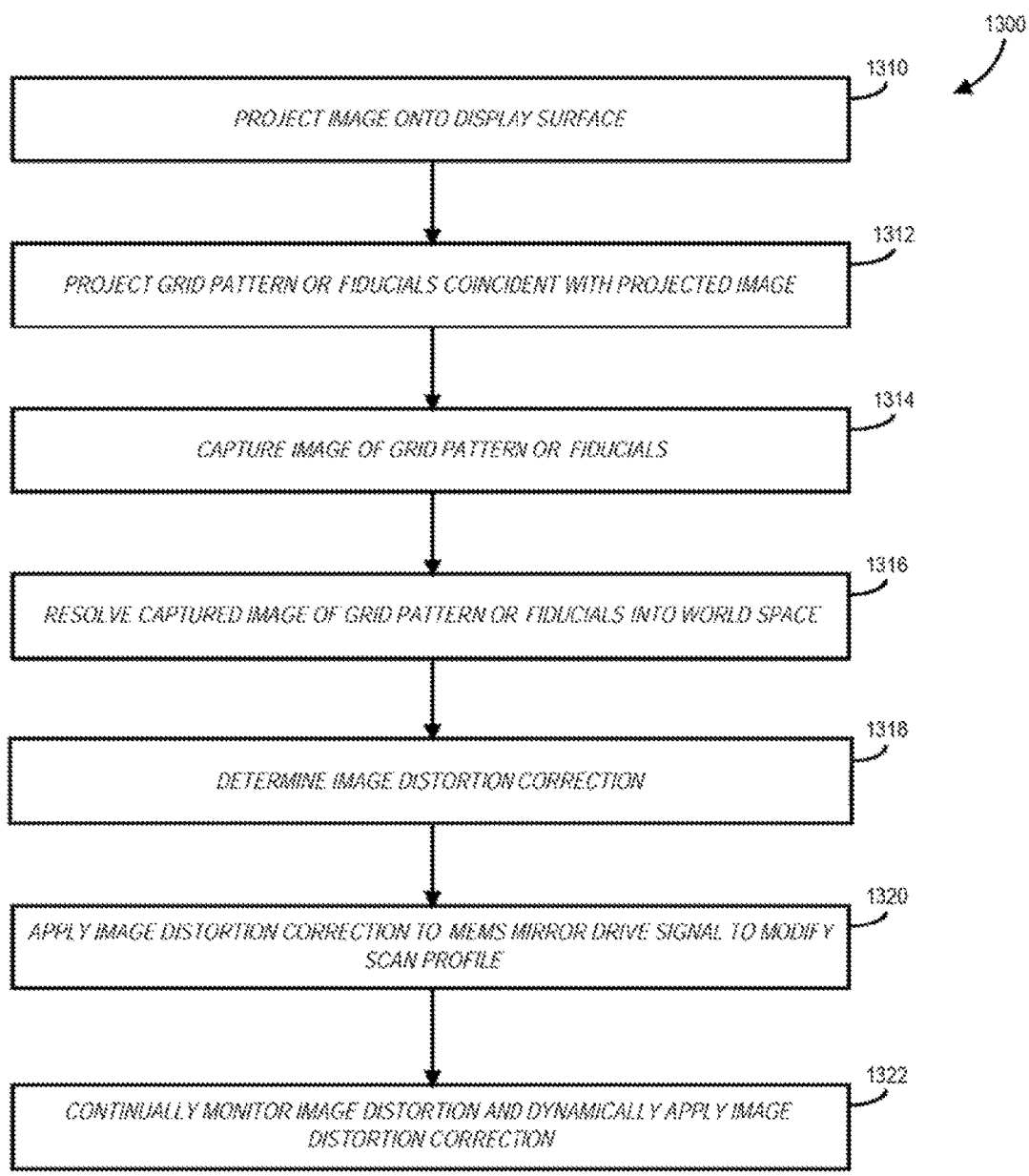
FIG. 13 is a diagram of a method to calibrate or otherwise adaptively detect and correct for image distortion in a projected image in accordance with one or more embodiments.

Referring now to FIG. 13, a diagram of a method to calibrate or otherwise adaptively detect and correct for image distortion in a projected image in accordance with one or more embodiments will be discussed. It should be noted that FIG. 13 illustrates one particular order and number of the operations of method 1300, whereas in other embodiments method 1300 may include more of fewer operations in various other orders, and the scope of the claimed subject matter is not limited in these respects. In one or more embodiments, an ideal velocity profile for driving MEMS scanning platform 314 may be automatically determined via image processing techniques. The automatically determined velocity profile may be utilized to generate an appropriate velocity profile with which to drive the MEMS scanning platform 314 to image distortion compensation or correction of the projected image 116. Method 1300 illustrates One such method using an overhead camera in single, offline calibration process, or alternatively in a dynamic auto-correction process.

At block 1310, an image 116 may be projected onto the display surface 118. At block 1312, projector 110 projects a grid pattern or fiducials coincident with the projected image 116. In one or more embodiments, light source 310 may include an infrared light source or infrared laser beam to project the grid pattern or fiducials, either as a separate offline test pattern, or an out-of-band test pattern that is temporally separated from the visible image, or an in-band test pattern that is temporally coincident with the visible image 116 without interfering with the user experience in viewing the image 116. Examples of a grid pattern and fiducials are shown in and described with respect to FIG. 14A and FIG. 14B, below. An image of the grid pattern or fiducials may be captured at block 1314, for example using camera 120 which may comprise an infrared camera in some embodiments where the grid pattern or fiducials are projected using an infrared light or laser beam. Display controller 322 may then resolve the captured image of the grid pattern or fiducials into world space at block 1316 to determine the topology of projection surface 118. Having knowledge of the topology of projection surface 118, at block 1318 display controller 322 may determine any needed image distortion correction due to the topology of projection surface 118. Display controller 322 may then apply image distortion correction at block 1320 to the MEMS drive signal to modify the scan profile of MEMS scanning platform 314. In some embodiments, display controller 322 may continually monitor image distortion and dynamically apply image distortion correction at block 1322, for example by continually executing one or more of the blocks of method 1300, although the scope of the claimed subject matter is not limited in this respect. Example grid patterns and fiducials utilized in method 1300 are shown in and described with respect to FIG. 14A and FIG. 14B, below.

Figure 14A:
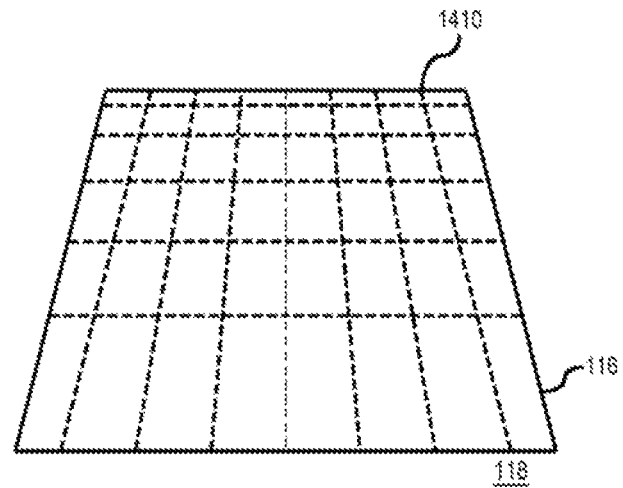
FIG. 14A and FIG. 14B are diagrams of an example grid pattern and example fiducials, respectively, to detect for image distortion in a projected image in accordance with one or more embodiments.
Figure 14B:
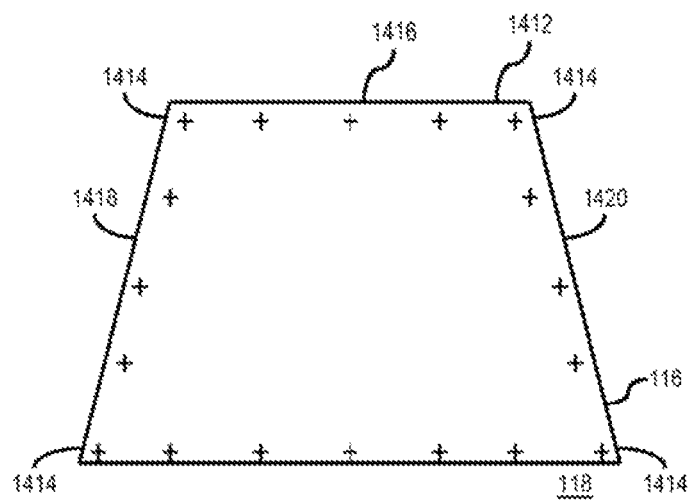

Referring now to FIG. 14A and FIG. 14B, diagrams of an example grid pattern and example fiducials, respectively, to detect for image distortion in a projected image in accordance with one or more embodiments will be discussed. In embodiments where projector 110 includes a visible or infrared (IR) camera 120 projecting image 116 at an unknown angle of incidence with respect to the projection surface 118, grid pattern 1410 may be displayed on the projection surface 118. As the projection and camera fields of view (FOVs) are fixed and known a-priori, the grid pattern 1410 may then be captured by the camera 120, and a view transform computed to resolve the image from camera space into world space, for example as discussed with respect to FIG. 13, above. In some embodiments, the same image processing functions may be run to allow for online or dynamic velocity auto-profiling in the event the projection angle of incidence with respect to the projection surface 118 changes.

In general, the extent of image keystoning or other image distortion in also may be determined using various other techniques. For example, in some embodiments light source 310 may include an infrared (IR) laser diode (LD) is in the optical path, and the projected infrared beam is combined with the red, green, and blue (RGB) beam 312 and scanned out by the MEMS mirror 316 via beam 324. Virtual measurement fiducials 1412 may be placed in the projected light beam 324 by pulsing the IR LD when the phase and/or position of MEMS scanning platform 314 corresponds to the four corners 1414 of the field of view (FOV) of projector 110, sparse locations along the frame 1416 of the FOV, and/or sparse locations along the left edge 1418 and right edge 1420 of the FOV, among other examples.

Using depth detection methods, for example a scanned beam time of flight (TOF) method that utilizes a single photodetector in place of a camera 120, the distance from the IR virtual fiducials 1412 to the projector 110 may be determined. Without interrupting the projected RGB video content of image 116, for example without using any calibration cycles, an auto-profiler routine running on display controller 322 may determine the correction needed to be applied and dynamically modify the scan profile to project a distortion corrected or compensated image 116. It should be noted that the IR fiducial approach is substantially similar to a process using a camera 120, the view transforms utilized in an IR approach will be a function of distance from the projection source. Other various approaches may be utilized to determine a suitable MEMS drive and velocity profile, and the scope of the claimed subject matter is not limited in these respects.

Figure 15:
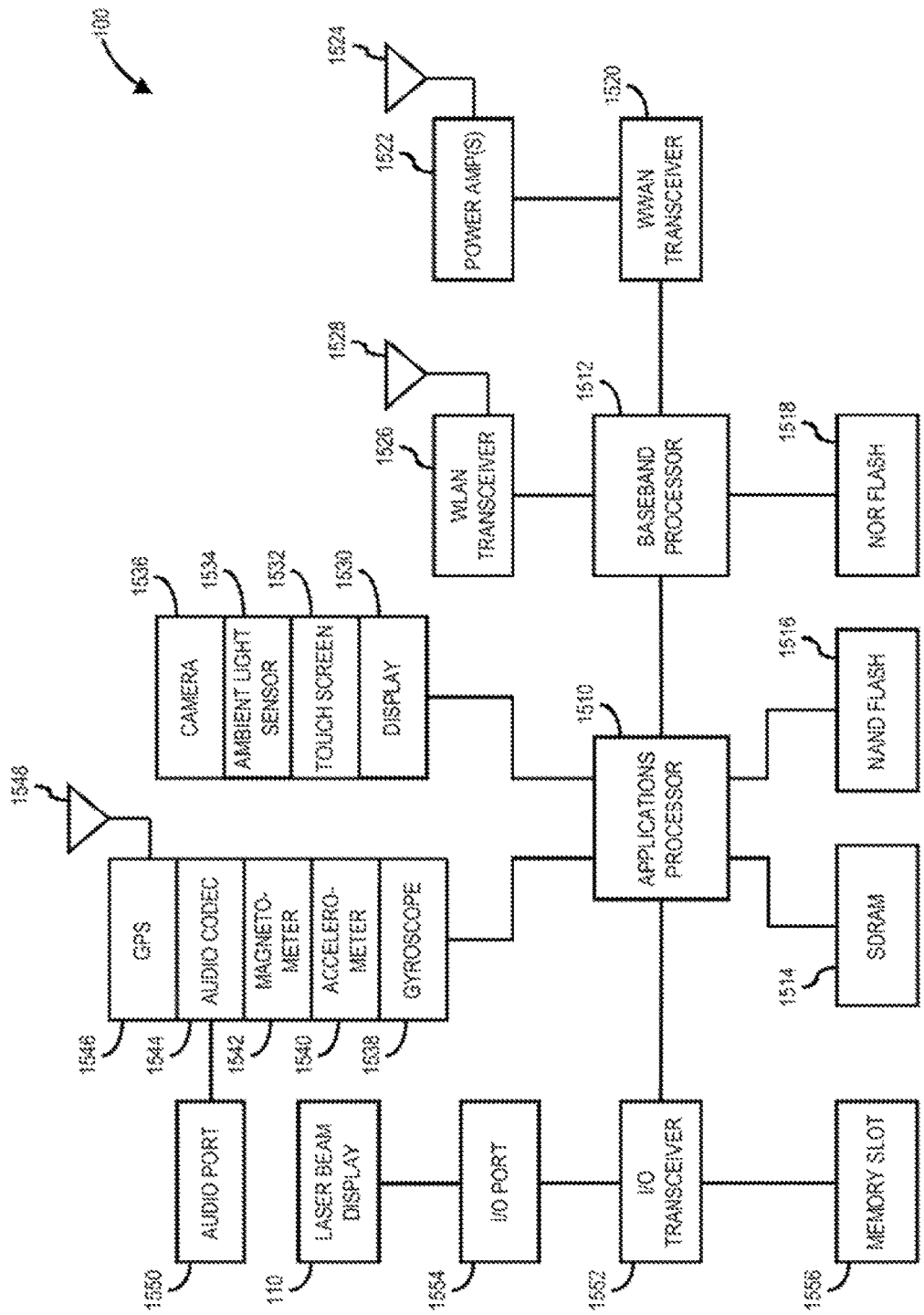
FIG. 15 is a block diagram of an information handling system having a projector to provide MEMS laser beam display utilizing MEMS scan controlled keystone and distortion correction in accordance with one or more embodiments.

Referring now to FIG. 15, a block diagram of an information handling system having a MEMS laser beam display utilizing MEMS scan controlled keystone and distortion correction in accordance with one or more embodiments will be discussed. Although information handling system 100 represents one example of several types of computing platforms, such as a smartphone, tablet, hand held gaming device, personal computer or the like, information handling system 100 may include more or fewer elements and/or different arrangements of elements than shown in FIG. 15, and the scope of the claimed subject matter is not limited in these respects. Information handling system 100 may utilize the MEMS laser beam display of FIG. 3 for example as a projector 110 to project an image 116 on a display surface 118, and further to implement MEMS scan controlled keystone and distortion correction as described herein, although the scope of the claimed subject matter is not limited in these respects.

In one or more embodiments, information handling system 100 may include an applications processor 1510 and a baseband processor 1512. Applications processor 1510 may be utilized as a general purpose processor to run applications and the various subsystems for information handling system 100. Applications processor 1510 may include a single core or alternatively may include multiple processing cores, for example wherein one or more of the cores may comprise a digital signal processor or digital signal processing core. Furthermore, applications processor 1510 may include a graphics processor or coprocessor disposed on the same chip, or alternatively a graphics processor coupled to applications processor 1510 may comprise a separate, discrete graphics chip. Applications processor 1510 may include on board memory such as cache memory, and further may be coupled to external memory devices such as synchronous dynamic random access memory (SDRAM) 1514 for storing and/or executing applications during operation, and NAND flash 1516 for storing applications and/or data even when information handling system 100 is powered off. In one or more embodiments, instructions to operate or configure the information handling system 100 and/or any of its components or subsystems to operate in a manner as described herein may be stored on an article of manufacture comprising a non-transitory storage medium. In one or more embodiments, the storage medium may comprise any of the memory devices shown in and described herein, although the scope of the claimed subject matter is not limited in this respect. Baseband processor 1512 may control the broadband radio functions for information handling system 100. Baseband processor 1512 may store code for controlling such broadband radio functions in a NOR flash 1518. Baseband processor 1512 controls a wireless wide area network (WWAN) transceiver 1520 which is used for modulating and/or demodulating broadband network signals, for example for communicating via a Third Generation (3G) or Fourth Generation (4G) network or the like or beyond, for example a Long Term Evolution (LTE) network. The WWAN transceiver 1520 couples to one or more power amps 1522 respectively coupled to one or more antennas 1524 for sending and receiving radio-frequency signals via the WWAN broadband network. The baseband processor 1512 also may control a wireless local area network (WLAN) transceiver 1526 coupled to one or more suitable antennas 1528 and which may be capable of communicating via a Wi-Fi, Bluetooth, and/or an amplitude modulation (AM) or frequency modulation (FM) radio standard including an IEEE 802.11 a/b/g/n standard or the like. It should be noted that these are merely example implementations for applications processor 1510 and baseband processor 1512, and the scope of the claimed subject matter is not limited in these respects. For example, any one or more of SDRAM 1514, NAND flash 1516 and/or NOR flash 1518 may comprise other types of memory technology such as magnetic memory, chalcogenide memory, phase change memory, or ovonic memory, and the scope of the claimed subject matter is not limited in this respect.

In one or more embodiments, applications processor 1510 may drive a display 1530 for displaying various information or data, and may further receive touch input from a user via a touch screen 1532 for example via a finger or a stylus. An ambient light sensor 1534 may be utilized to detect an amount of ambient light in which information handling system 100 is operating, for example to control a brightness or contrast value for display 1530 as a function of the intensity of ambient light detected by ambient light sensor 1534. One or more cameras 1536 may be utilized to capture images that are processed by applications processor 1510 and/or at least temporarily stored in NAND flash 1516. Furthermore, applications processor may couple to a gyroscope 1538, accelerometer 1540, magnetometer 1542, audio coder/decoder (CODEC) 1544, and/or global positioning system (GPS) controller 1546 coupled to an appropriate GPS antenna 1548, for detection of various environmental properties including location, movement, and/or orientation of information handling system 100. Alternatively, controller 1546 may comprise a Global Navigation Satellite System (GNSS) controller. Audio CODEC 1544 may be coupled to one or more audio ports 1550 to provide microphone input and speaker outputs either via internal devices and/or via external devices coupled to information handling system via the audio ports 1550, for example via a headphone and microphone jack. In addition, applications processor 1510 may couple to one or more input/output (I/O) transceivers 1552 to couple to one or more I/O ports 1554 such as a universal serial bus (USB) port, a high-definition multimedia interface (HDMI) port, a serial port, and so on. Furthermore, one or more of the I/O transceivers 1552 may couple to one or more memory slots 1556 for optional removable memory such as secure digital (SD) card or a subscriber identity module (SIM) card, although the scope of the claimed subject matter is not limited in these respects. In one or more embodiments, the MEMS laser beam display may 110 be coupled to one or more of the I/O transceivers 1552 and may be integrated within a housing of information handling system 100 or alternatively may be disposed exterior to the housing, although the scope of the claimed subject matter is not limited in these respects.

Figure 16:
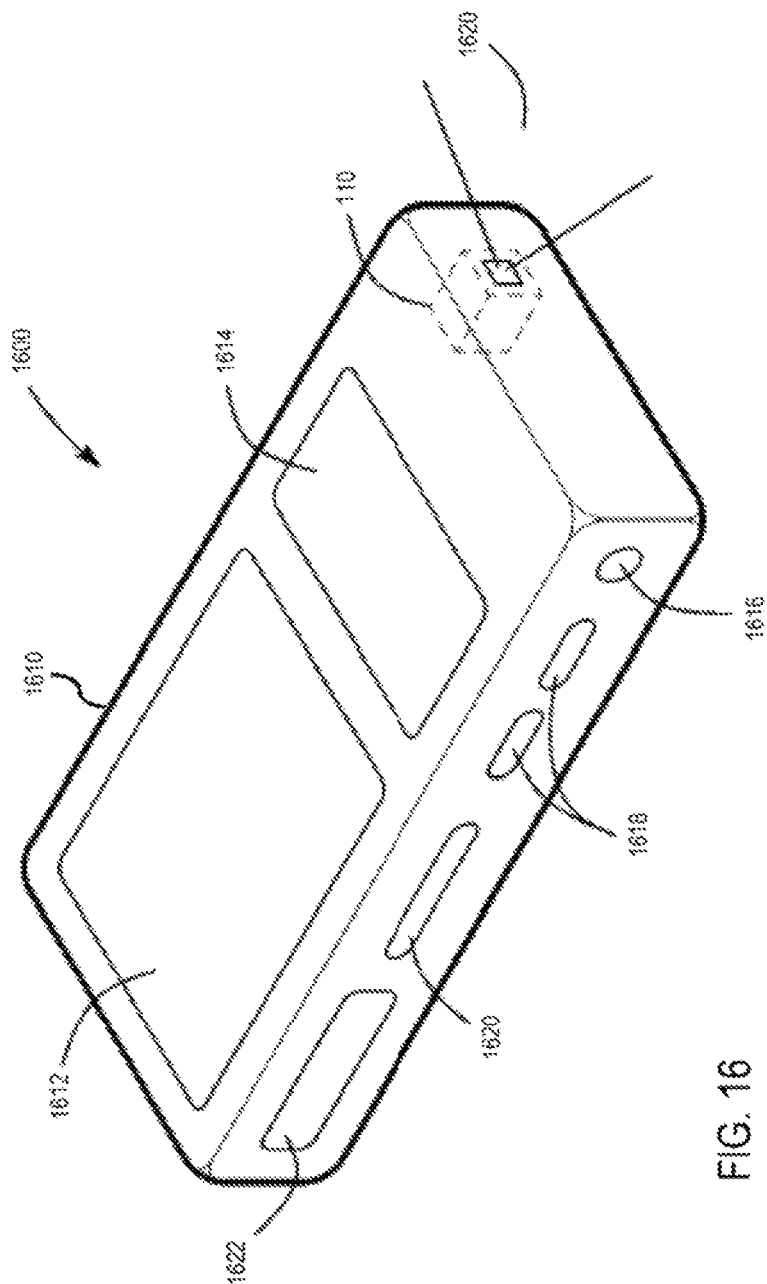
FIG. 16 is an isometric view of an information handling system that includes a MEMS laser beam display utilizing MEMS scan controlled keystone and distortion correction in accordance with one or more embodiments.

Referring now to FIG. 16, an isometric view of an information handling system that includes a MEMS laser beam display 110 utilizing MEMS scan controlled keystone and distortion correction in accordance with one or more embodiments will be discussed. The information handling system 1600 of FIG. 16 may represent a tangible embodiment of the information handling system 100 of FIG. 15. Information handling system 1600 may comprise any of several types of computing platforms, including cell phones, personal digital assistants (PDAs), netbooks, notebook computers, internet browsing devices, tablets, pads, and so on, and the scope of the claimed subject matter is not limited in these respects. In the example shown in FIG. 16, information handling system 1600 may comprise a housing 1610 to house MEMS laser beam display 110 as discussed herein, for example to provide a scanned output beam 1620 to project an image and/or to provide MEMS scan controlled keystone and distortion correction as discussed herein. Information handling system 1600 optionally may include a display 1612 which may be a touch screen display, keyboard 1614 or other control buttons or actuators, a speaker or headphone jack 1616 with optional microphone input, control buttons 1618, memory card slot 1620, and/or input/output (I/O) port 1622, or combinations thereof. Furthermore, information handling system 1600 may have other form factors and fewer or greater features than shown, and the scope of the claimed subject matter is not limited in these respects.

Figure 17:
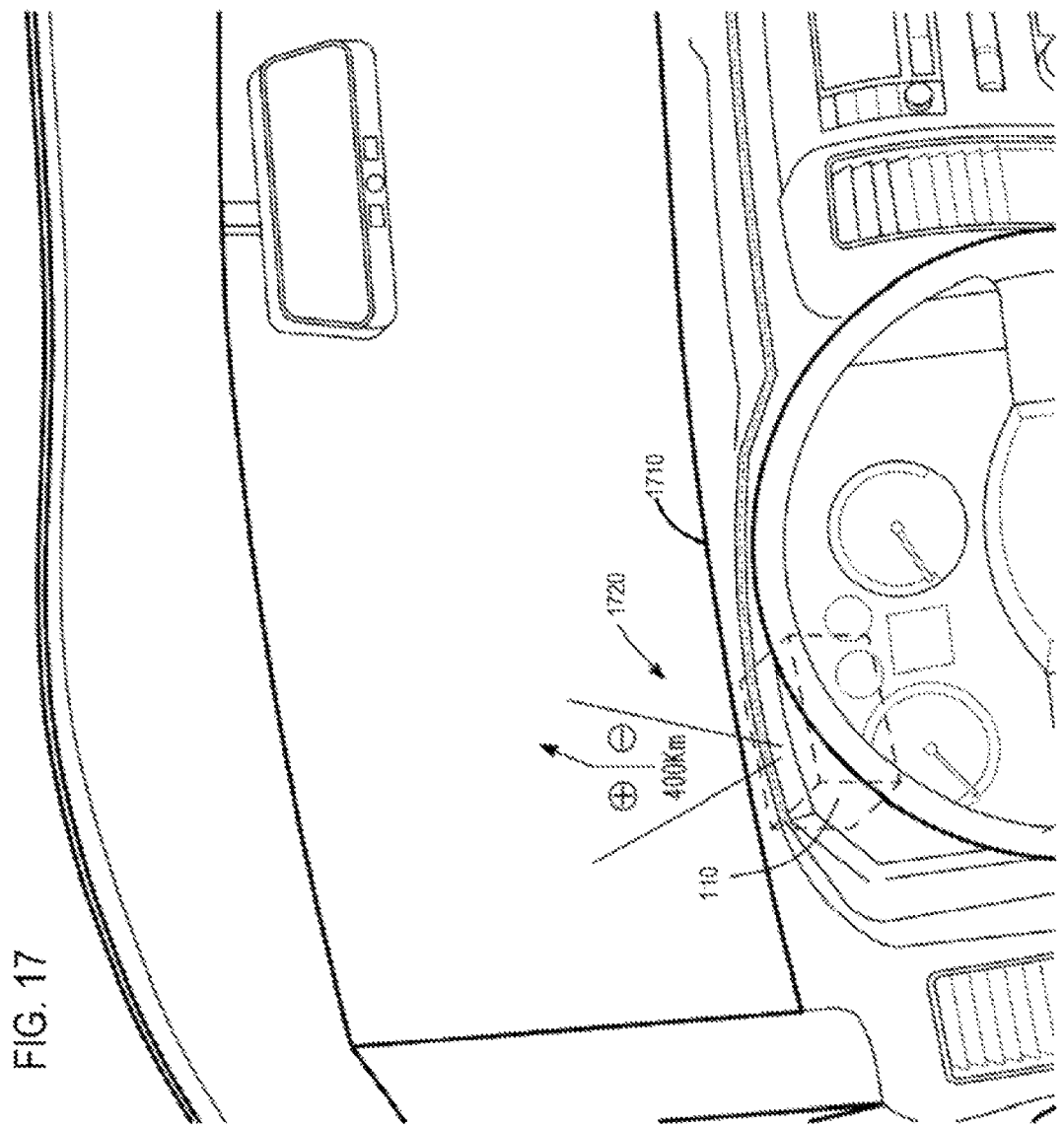
FIG. 17 is a diagram of a vehicle that includes a MEMS laser beam display utilizing MEMS scan controlled keystone and distortion correction deployed in a head-up display (HUD) in accordance with one or more embodiments.

Referring now to FIG. 17, a diagram of a vehicle that includes a MEMS laser beam display utilizing MEMS scan controlled keystone and distortion correction deployed in a head-up display (HUD) in accordance with one or more embodiments will be discussed. In the embodiment shown in FIG. 17, the MEMS laser beam display 110 may be deployed in a vehicle 1710 such as in the dashboard of the automobile 1710, and which may project an image 1720 that may be viewable by an operator or passenger of the vehicle. Although FIG. 17 shows one example deployment of a MEMS laser beam display 110 utilizing MEMS scan controlled keystone and distortion correction as a display projector, other types of deployments likewise may be provided, and the scope of the claimed subject matter is not limited in this respect.

Figure 18:
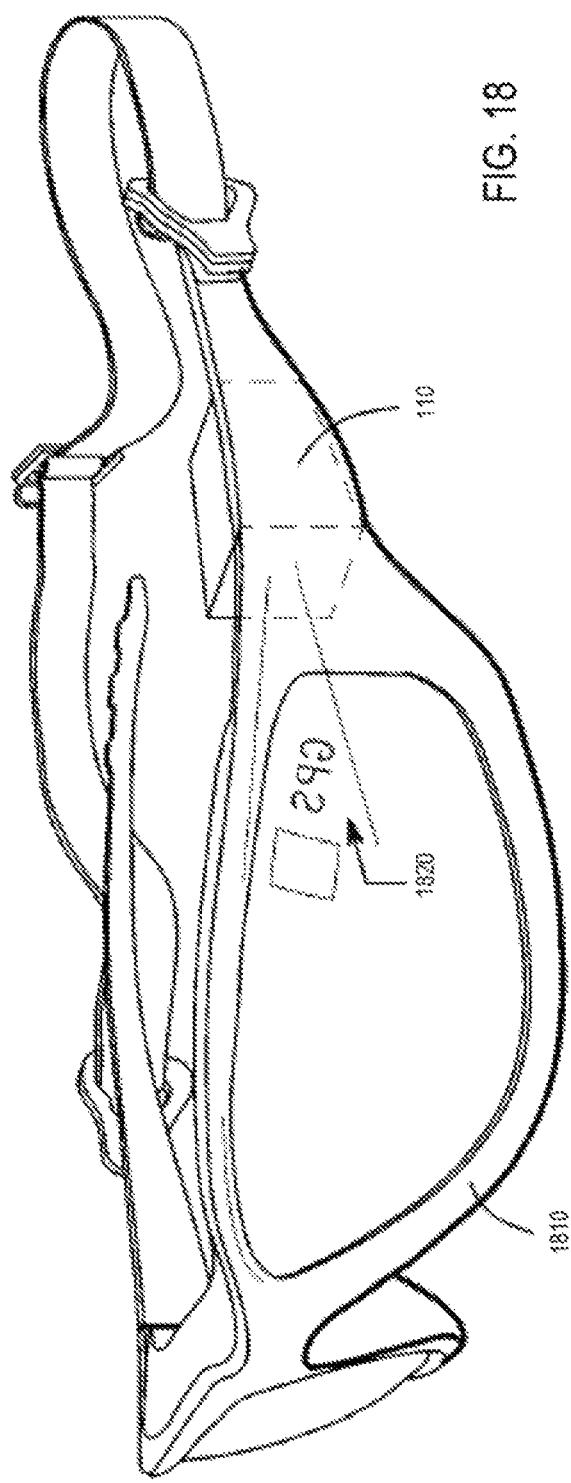
FIG. 18 is a diagram of eyewear that includes a MEMS laser beam display utilizing MEMS scan controlled keystone and distortion correction deployed in a head-mounted display (HMD) in accordance with one or more embodiments.

Referring now to FIG. 18, a diagram of eyewear that includes a MEMS laser beam display utilizing MEMS scan controlled keystone and distortion correction deployed in a head-mounted display (HMD) in accordance with one or more embodiments will be discussed. In the embodiment shown in FIG. 18, the MEMS laser beam display beam scanner 110 may be deployed in eyewear 1810 or other head worn device, for example attached to a frame of the eyewear 1810, and which may project an image 1820 that may be viewable by the wearer of the eyewear 1810. Although FIG. 18 shows one example deployment of a MEMS laser beam display 110 utilizing MEMS scan controlled keystone and distortion correction in a display projector, other types of deployments likewise may be provided, and the scope of the claimed subject matter is not limited in this respect.

Figure 19:
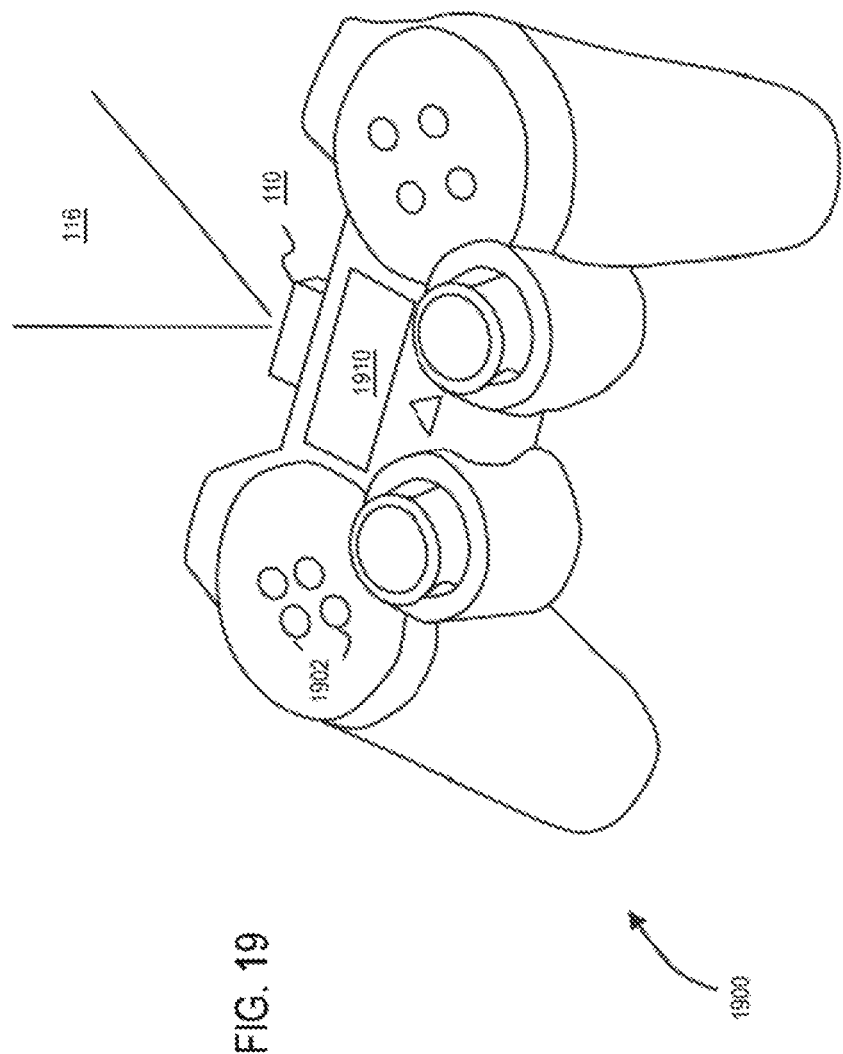
FIG. 19 is a diagram a gaming apparatus in accordance with one or more embodiments.

Referring now to FIG. 19, a diagram a gaming apparatus in accordance with one or more embodiments will be discussed. Gaming apparatus 1900 includes buttons 1902, display 1910, and projector 110. In some embodiments, gaming apparatus 1900 is a standalone apparatus that does not need a larger console for a user to play a game. For example, a user may play a game while watching display 1910 and/or the projected content at 116. In other embodiments, a use may watch a larger screen tethered to the console in combination with watching display 1910 and/or projected content at 116.

Although the claimed subject matter has been described with a certain degree of particularity, it should be recognized that elements thereof may be altered by persons skilled in the art without departing from the spirit and/or scope of claimed subject matter. It is believed that the subject matter pertaining to MEMS scan controlled keystone and distortion correction and many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A MEMS scanned beam projector, comprising:
 a light source to emit a light beam;
 a scanning platform to redirect the light beam impinging on the platform; and
 a display controller to control the light source and the scanning platform to cause the scanning platform to scan the light beam in a vertical direction and a horizontal direction in a scan pattern to project an image onto a projection surface;
 wherein the display controller is configured to compensate for horizontal stretching in the projected image due to geometric distortion by modifying a start position and an end position of video path interpolation as a function of vertical scan position to reduce the horizontal stretching of the projected image, and wherein the display controller is further configured to adjust an interpolation rate to correct for image distortion in the projected image.

2. The MEMS scanned beam projector as claimed in claim 1, wherein the display controller is further configured to compensate for aspect ratio distortion in the projected image by reducing an amplitude of vertical displacement of the scanning platform.

3. The MEMS scanned beam projector as claimed in claim 1, wherein the display controller is configured to adjust the interpolation rate to correct for image distortion by adjusting the as a function of vertical scan position to reduce the horizontal stretching of the projected image.

4. The MEMS scanned beam projector as claimed in claim 1, wherein the display controller is further configured to correct for image distortion in the projected image by providing a compensated drive signal to the scanning platform to compensate for the image distortion.

5. The MEMS scanned beam projector as claimed in claim 1, wherein the display controller is configured to further compensate for horizontal stretching in the projected image due to geometric distortion by modulation of the scanning platform in the horizontal direction as a function of vertical scan position to reduce or eliminate the horizontal stretching.

6. A MEMS scanned beam projector, comprising:
a light source to emit a light beam;
a scanning platform to redirect the light beam impinging on the platform; and
a display controller to control the light source and the scanning platform to cause the scanning platform to scan the light beam in a vertical direction and a horizontal direction in a scan pattern to project an image onto a projection surface;
wherein the display controller is configured to compensate for horizontal stretching in the projected image due to geometric distortion by modifying a start position and an end position of video path interpolation as a function of vertical scan position to reduce the horizontal stretching of the projected image, wherein the display controller is configured to compensate for aspect ratio distortion in the projected image by reducing an amplitude of vertical displacement of the scanning platform.

7. The MEMS scanned beam projector as claimed in claim 1, wherein the display controller is configured to compensate for variation in horizontal line spacing in the projected image by modulating the scanning platform in the vertical direction with a non-constant velocity.

8. The MEMS scanned beam projector as claimed in claim 7, wherein the non-constant velocity comprises a linearly increasing velocity, an exponentially increasing velocity, a parabolically changing velocity, a hyperbolically changing velocity, a piece-wise linearly changing velocity, or an asymmetric notch velocity, or a combination thereof.

9. The MEMS scanning platform as claimed in claim 1, wherein:
the display controller is configured to cause the scanning platform to project a grid pattern or one or more fiducial as part of the projected image; and
a camera to detect the grid pattern or the one or more fiducials;
wherein the display controller is further configured to determine the correction needed to compensate for the horizontal stretching for the projected image based at least in part on the detected grid pattern or the one or more fiducials.

10. The MEMS scanning platform as claimed in claim 9, wherein:
the light source includes an infrared light source to emit an infrared light as a component of the light beam;
the display controller is configured to project the grid pattern or the one or more fiducials using the infrared light;
the camera is an infrared camera to detect the grid pattern or the one or more fiducials as a component of the light beam.

11. The MEMS scanning platform as claimed in claim 10, wherein the display controller is configured to detect a distance from the MEMS scanned beam projector to the projection surface using time of flight analysis on the infrared light, and the display controller utilizes the detected distance to determine a compensated drive signal to provide to the scanning platform.

12. A method to compensate for image distortion in an image projected by a MEMS scanned beam projector, the method comprising:
redirecting a light beam from a light source impinging on a scanning platform;
controlling the light source and the scanning platform to cause the scanning platform to scan the light beam in a vertical direction and a horizontal direction in a scan pattern to project an image onto a projection surface;
compensating for horizontal stretching in the projected image due to geometric distortion by modifying a start position and an end position of video path interpolation as a function of vertical scan position to reduce the horizontal stretching of the projected image; and
adjusting an interpolation rate to correct for image distortion in the projected image.

13. The method as claimed in claim 12, wherein the adjusting the interpolation rate to correct for image distortion in the projected image comprises adjusting the interpolation rate such that interpolation spacing operates as a function of vertical scan position to reduce the horizontal stretching of the projected image.

14. The method as claimed in claim 12, further comprising:
correcting for image distortion in the projected image by providing a compensated drive signal to the scanning platform to compensate for the image distortion.

15. The method as claimed in claim 12, further comprising:
compensating for horizontal stretching in the projected image due to geometric distortion by modulation of the scanning platform in the horizontal direction as a function of vertical scan position to reduce or eliminate the horizontal stretching.

16. The method as claimed in claim 12, further comprising:
compensating for aspect ratio distortion in the projected image by reducing an amplitude of vertical displacement of the scanning platform.

17. The method as claimed in claim 12, further comprising:
compensating for variation in horizontal line spacing in the projected image by modulating the scanning platform in the vertical direction with a non-constant velocity.

18. The method as claimed in claim 17, wherein the non-constant velocity comprises a linearly increasing velocity, an exponentially increasing velocity, a parabolically changing velocity, a hyperbolically changing velocity, a piece-wise linearly changing velocity, or an asymmetric notch velocity, or a combination thereof.

19. The method as claimed in claim 12, further comprising:
causing the scanning platform to project a grid pattern or one or more fiducial as part of the projected image;
detecting the grid pattern or the one or more fiducials with a camera; and
determining the correction needed to compensate for the horizontal stretching for the projected image based at least in part on the detected grid pattern or the one or more fiducials.

20. The method as claimed in claim 19, wherein:
the light source includes an infrared light source to emit an infrared light as a component of the light beam, and the grid pattern or the one or more fiducials are projected using the infrared light;
detecting the grid pattern or the one or more fiducials with the camera, wherein the camera comprises an infrared camera.

21. The method as claimed in claim 20, further comprising:

detecting a distance from the MEMS scanned beam projector to the projection surface using time of flight analysis on the infrared light; and utilizing the detected distance to determine a compensated drive signal to provide to the scanning platform.

22. A MEMS scanned beam projector, comprising:

a light source to emit a light beam;

a scanning platform to redirect the light beam impinging on the platform; and a display controller to control the light source and the scanning platform to cause the scanning platform to scan the light beam in a vertical direction and a horizontal direction in a scan pattern to project an image onto a projection surface, where the image includes a plurality of pixels arranged in a plurality of horizontal lines;

wherein the display controller is configured to compensate for horizontal stretching in the projected image due to geometric distortion by adjusting a horizontal interpolation rate between neighboring pixels in the plurality of pixels such that horizontal interpolation spacing operates as a function of vertical scan position and by modifying a start position and a stop position of the horizontal lines as a function of vertical scan position to reduce the horizontal stretching.

23. The MEMS scanned beam projector as claimed in claim 22, wherein the display controller is further configured to compensate for aspect ratio distortion in the projected image by reducing an amplitude of vertical displacement of the scanning platform.

* * * * *